Sept. 25, 1962 L. C. PEARCE 3,055,656
COLLATION OF SHEET MATERIAL
Filed Sept. 21, 1959 19 Sheets-Sheet 1

INVENTOR.
LEWIS C. PEARCE
BY
Mellin and Hanscom
ATTORNEYS

Sept. 25, 1962

L. C. PEARCE 3,055,656

COLLATION OF SHEET MATERIAL

Filed Sept. 21, 1959

INVENTOR.
LEWIS C. PEARCE
BY
Mellin and Hanscom
ATTORNEYS

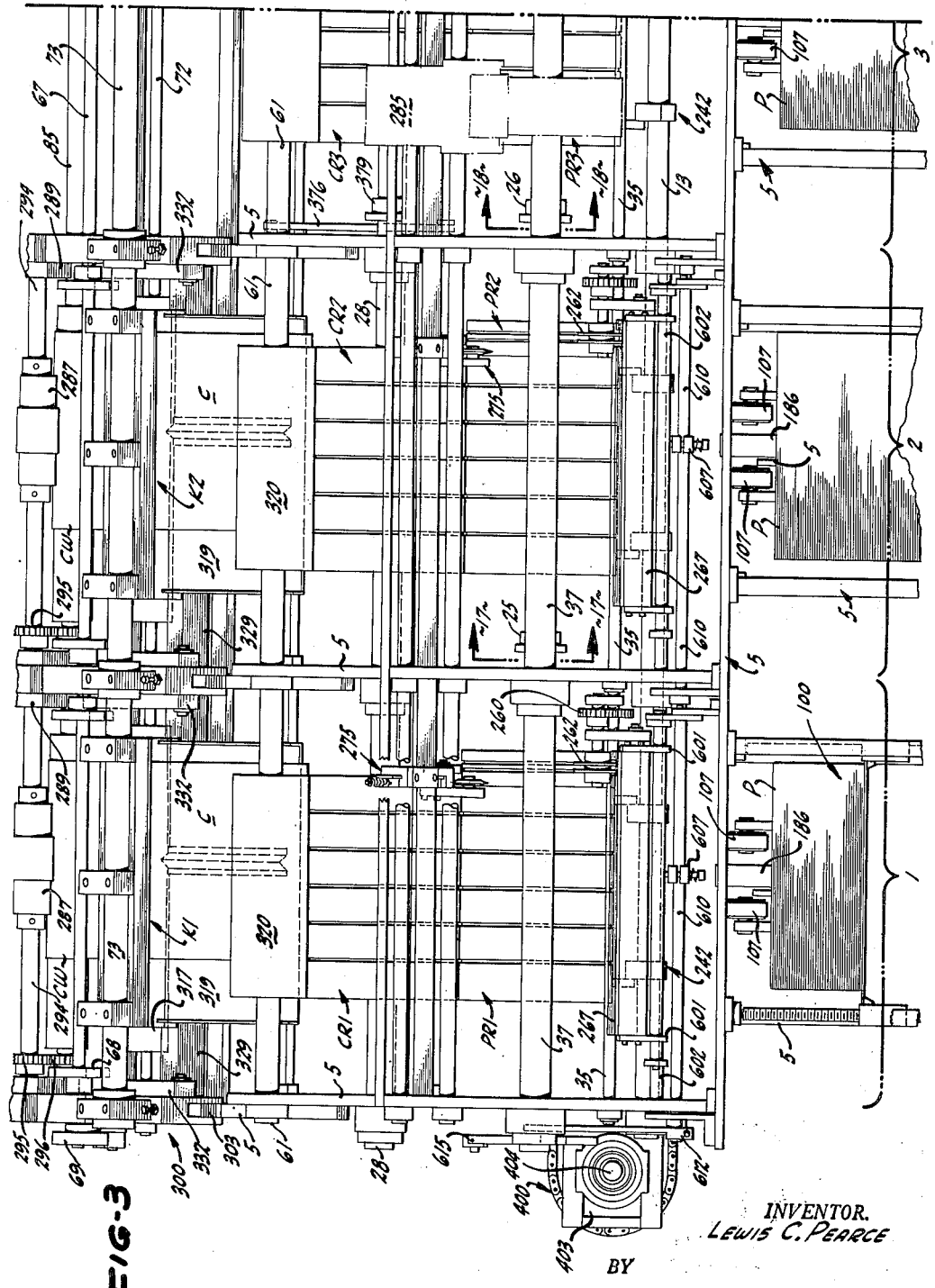

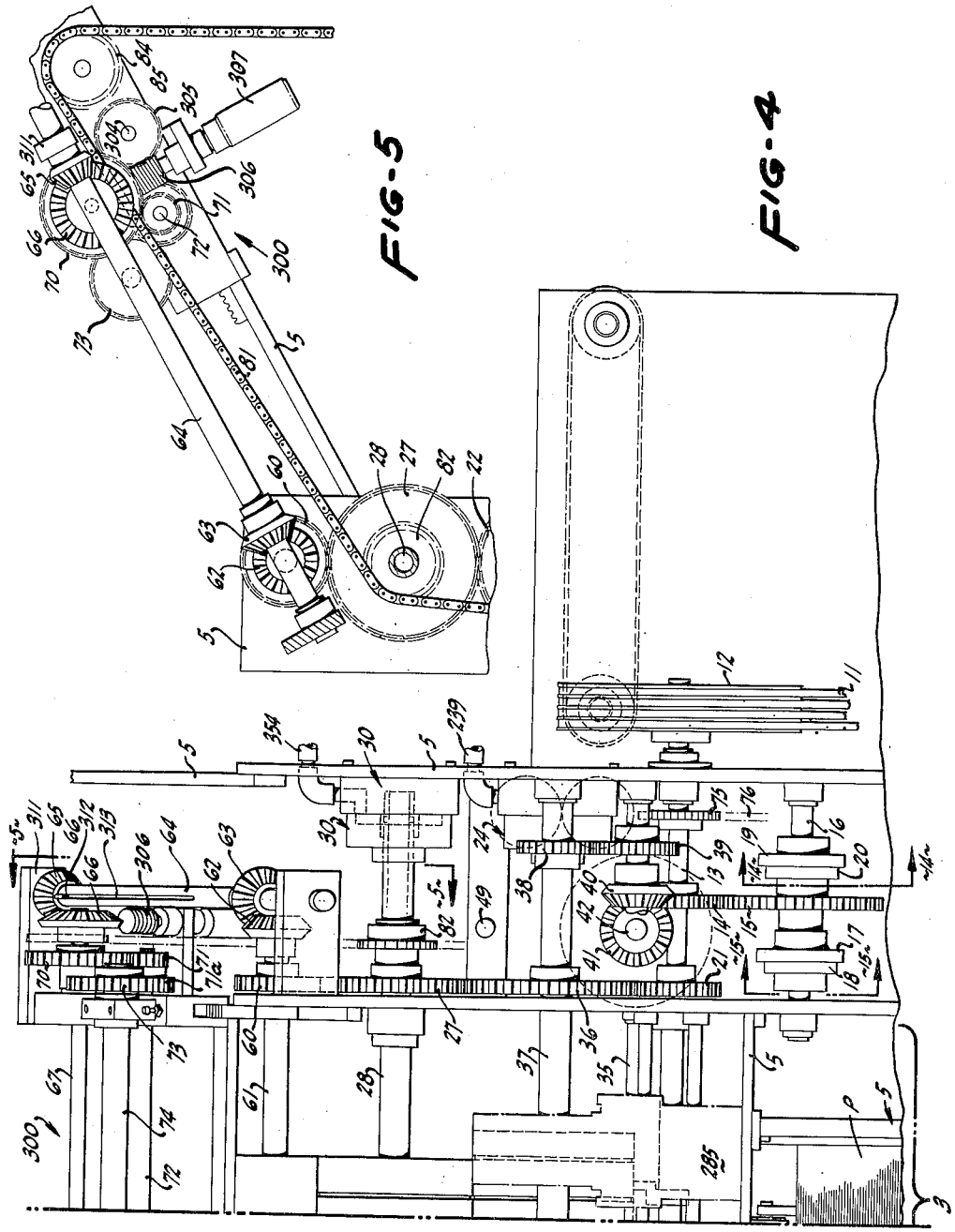

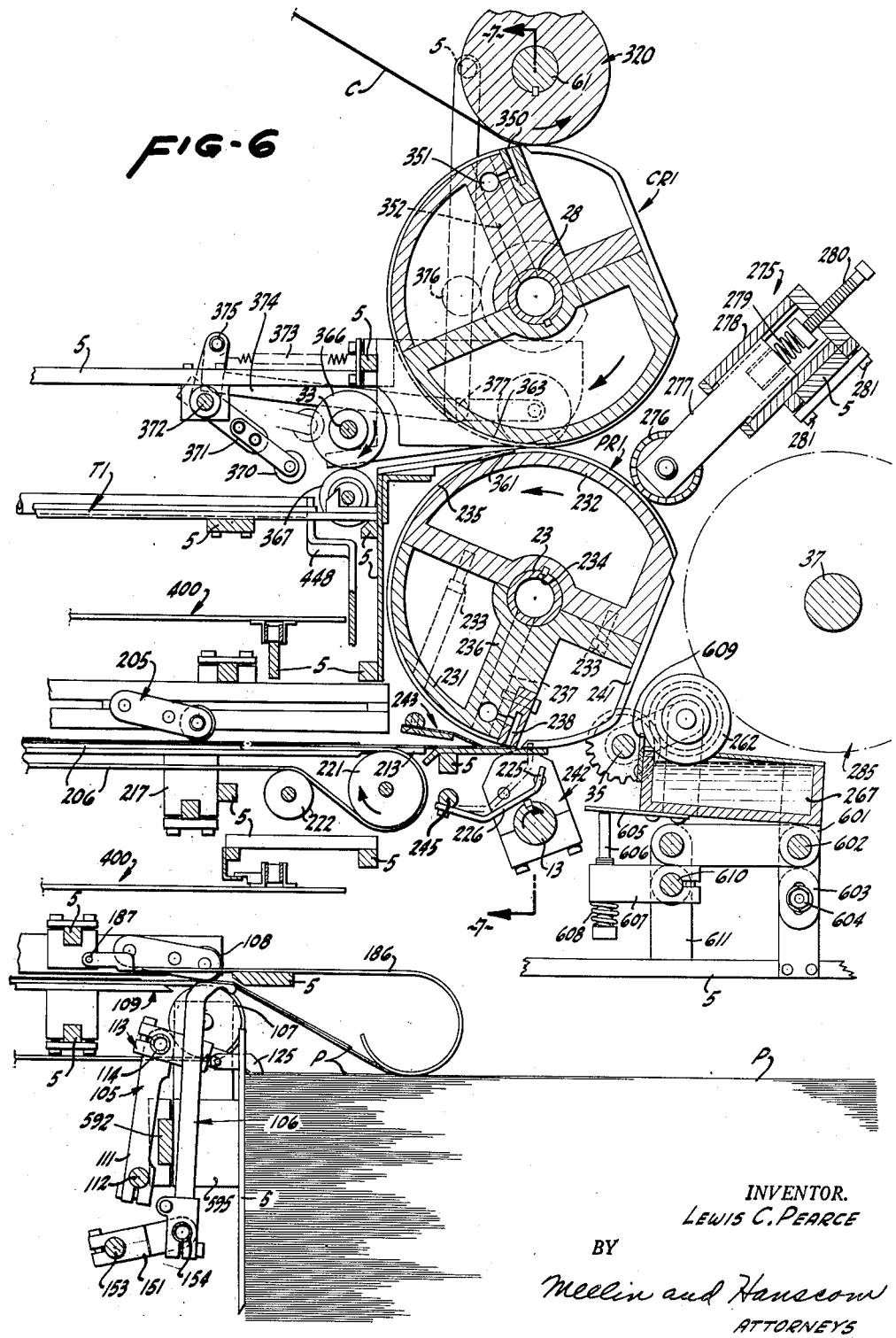

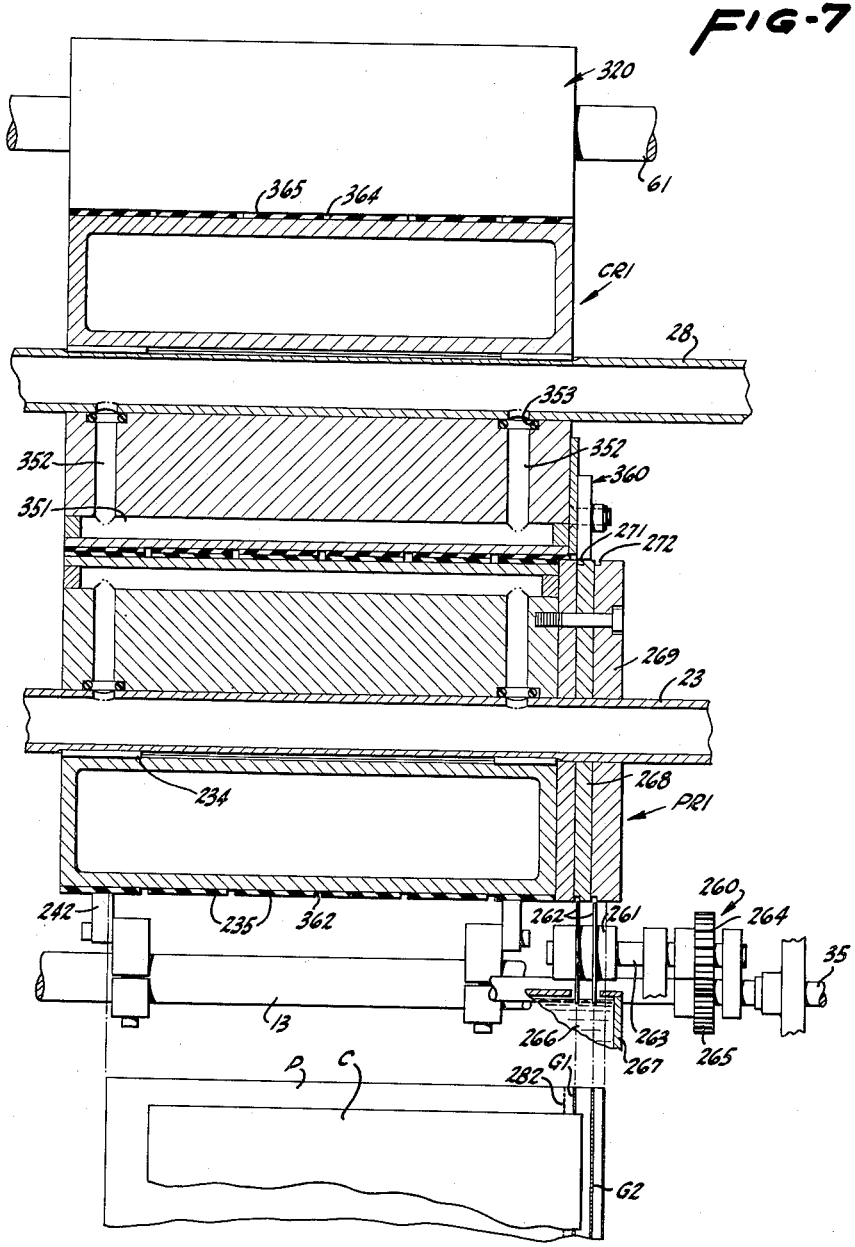

Sept. 25, 1962 L. C. PEARCE 3,055,656
COLLATION OF SHEET MATERIAL
Filed Sept. 21, 1959 19 Sheets-Sheet 8

INVENTOR.
LEWIS C. PEARCE
BY
Mellin and Hanscom
ATTORNEYS

Sept. 25, 1962  L. C. PEARCE  3,055,656
COLLATION OF SHEET MATERIAL
Filed Sept. 21, 1959  19 Sheets-Sheet 9

INVENTOR.
LEWIS C. PEARCE
BY
Mellin and Hanscom
ATTORNEYS

INVENTOR.
LEWIS C. PEARCE

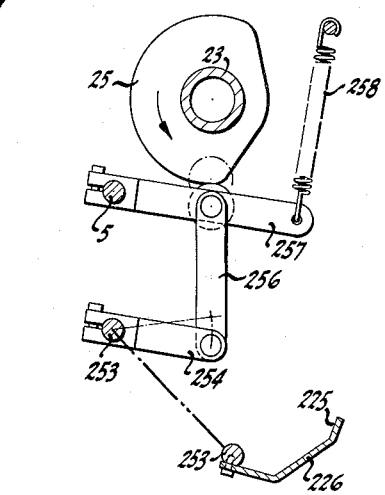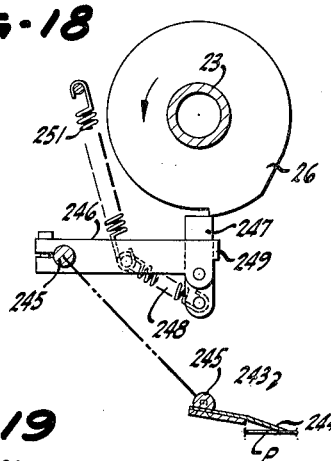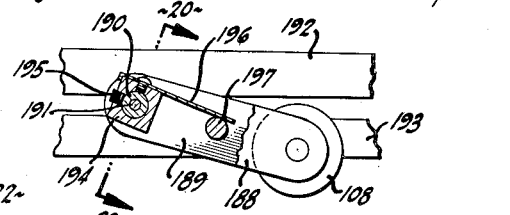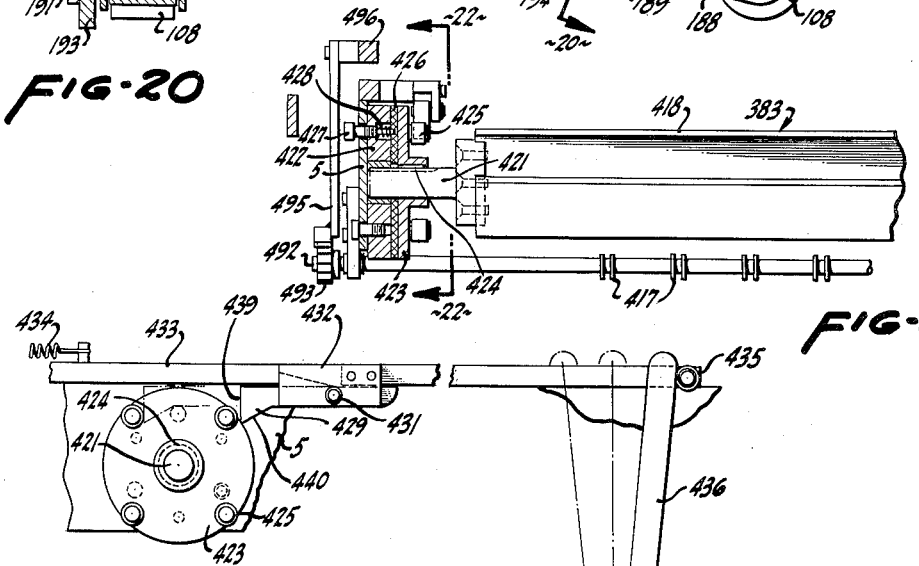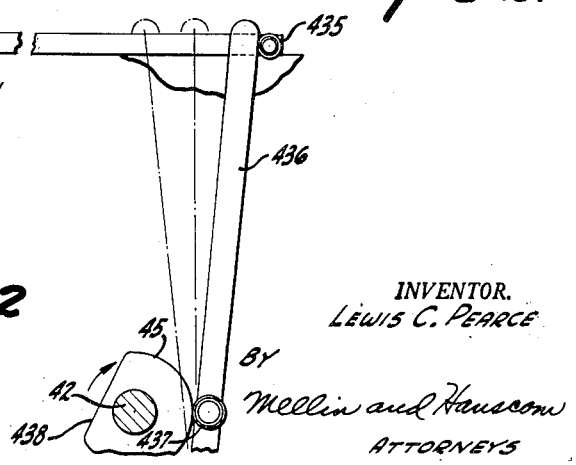

Sept. 25, 1962  L. C. PEARCE  3,055,656
COLLATION OF SHEET MATERIAL
Filed Sept. 21, 1959  19 Sheets-Sheet 12
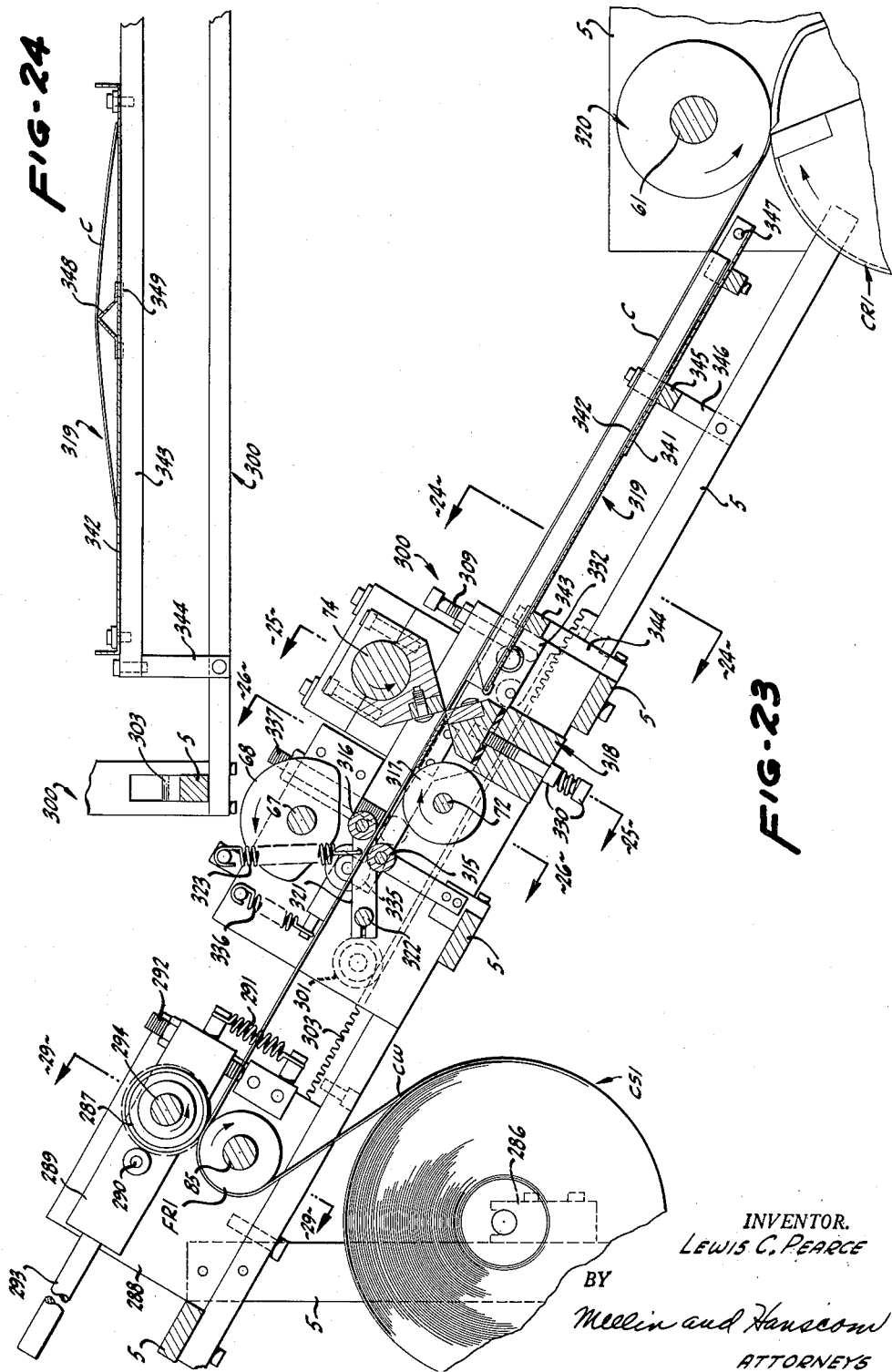
INVENTOR.
LEWIS C. PEARCE
BY
Mellin and Hanscom
ATTORNEYS Sept. 25, 1962 L. C. PEARCE 3,055,656
COLLATION OF SHEET MATERIAL
Filed Sept. 21, 1959 19 Sheets-Sheet 13
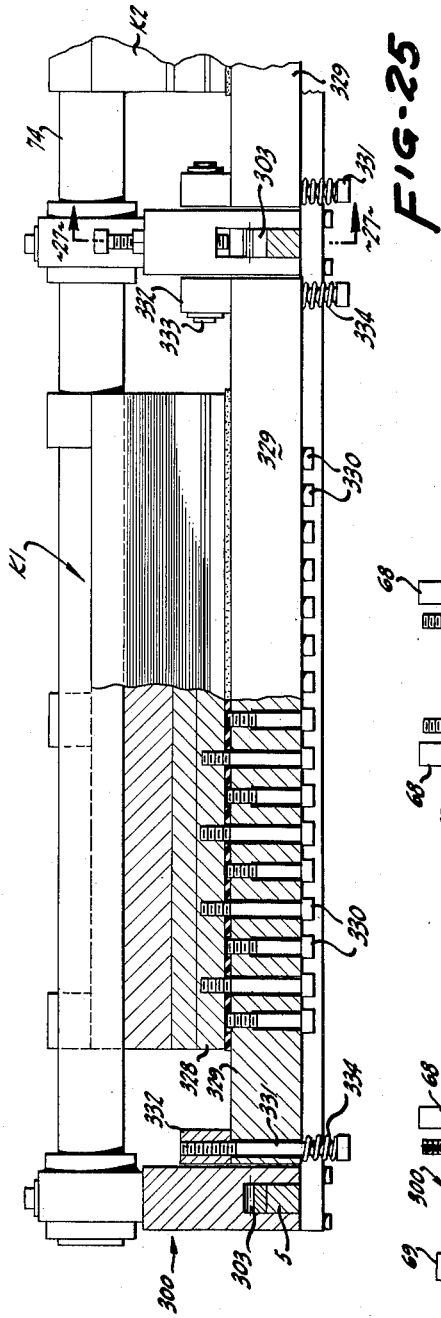
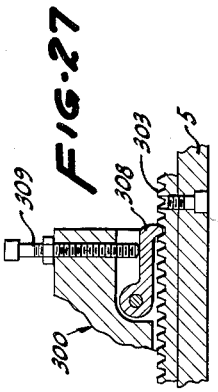
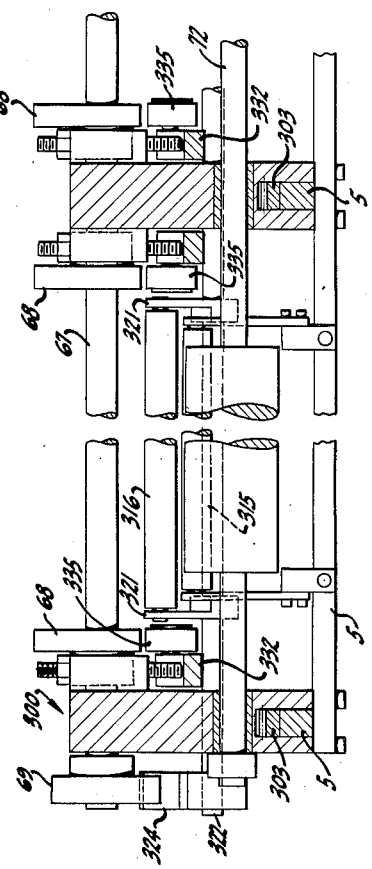
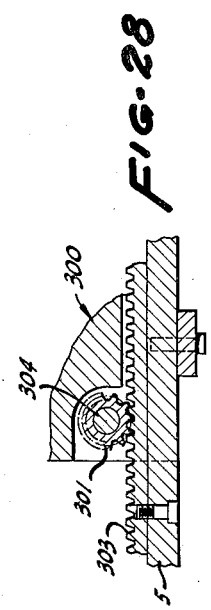
INVENTOR.
LEWIS C. PEARCE
BY
Meelin and Hanscom
ATTORNEYS

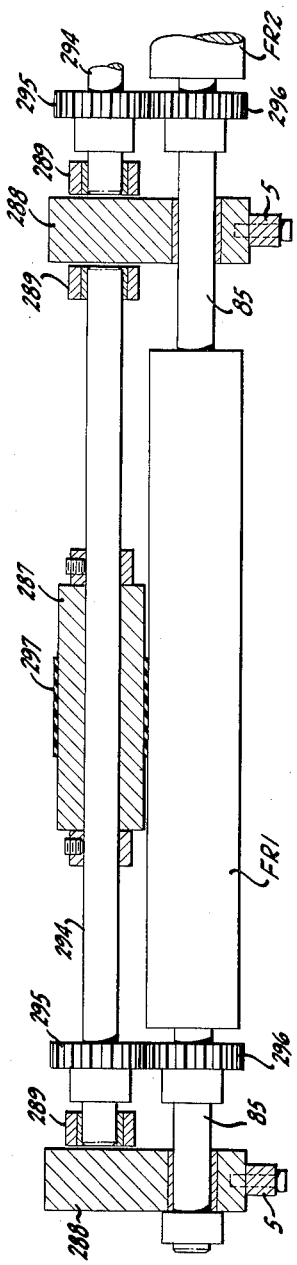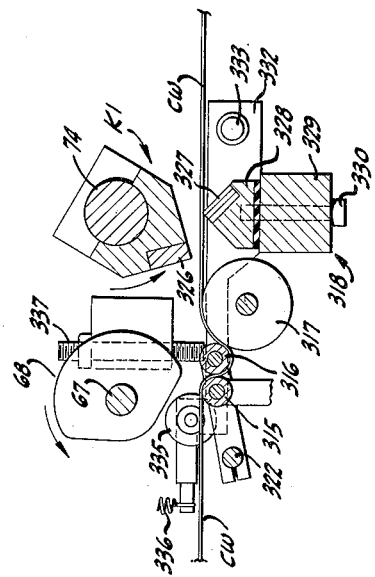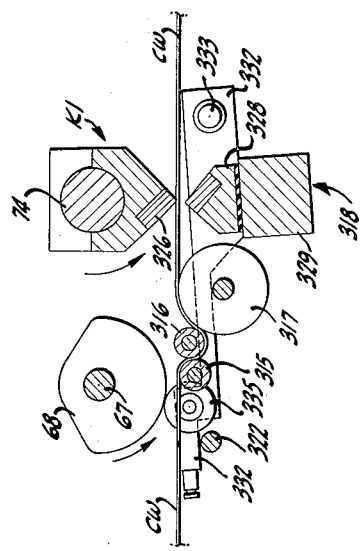

Sept. 25, 1962 L. C. PEARCE 3,055,656
COLLATION OF SHEET MATERIAL
Filed Sept. 21, 1959 19 Sheets-Sheet 16
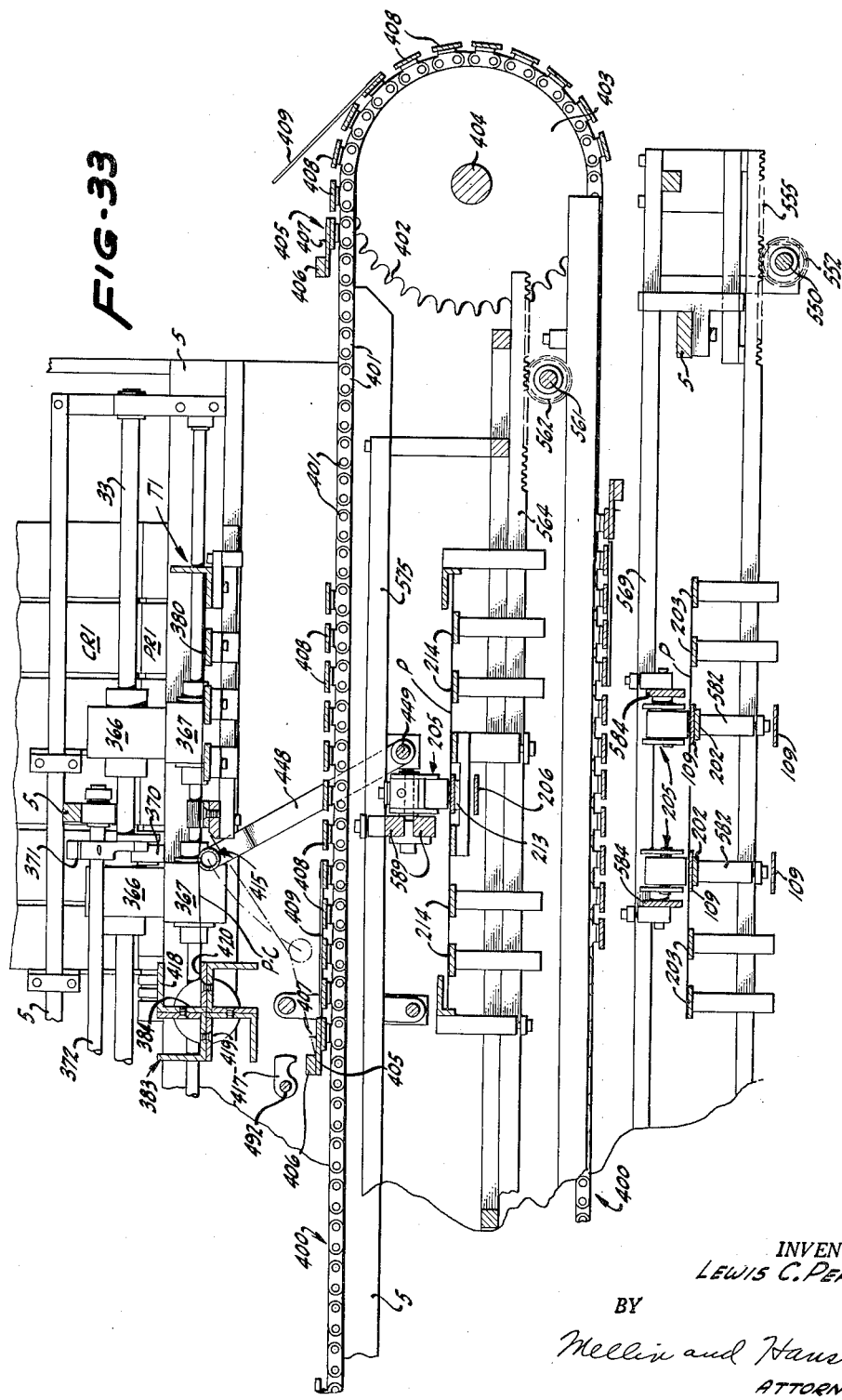
INVENTOR.
LEWIS C. PEARCE
BY
Mellin and Hauscom
ATTORNEYS Sept. 25, 1962
L. C. PEARCE
3,055,656
COLLATION OF SHEET MATERIAL
Filed Sept. 21, 1959
19 Sheets-Sheet 17
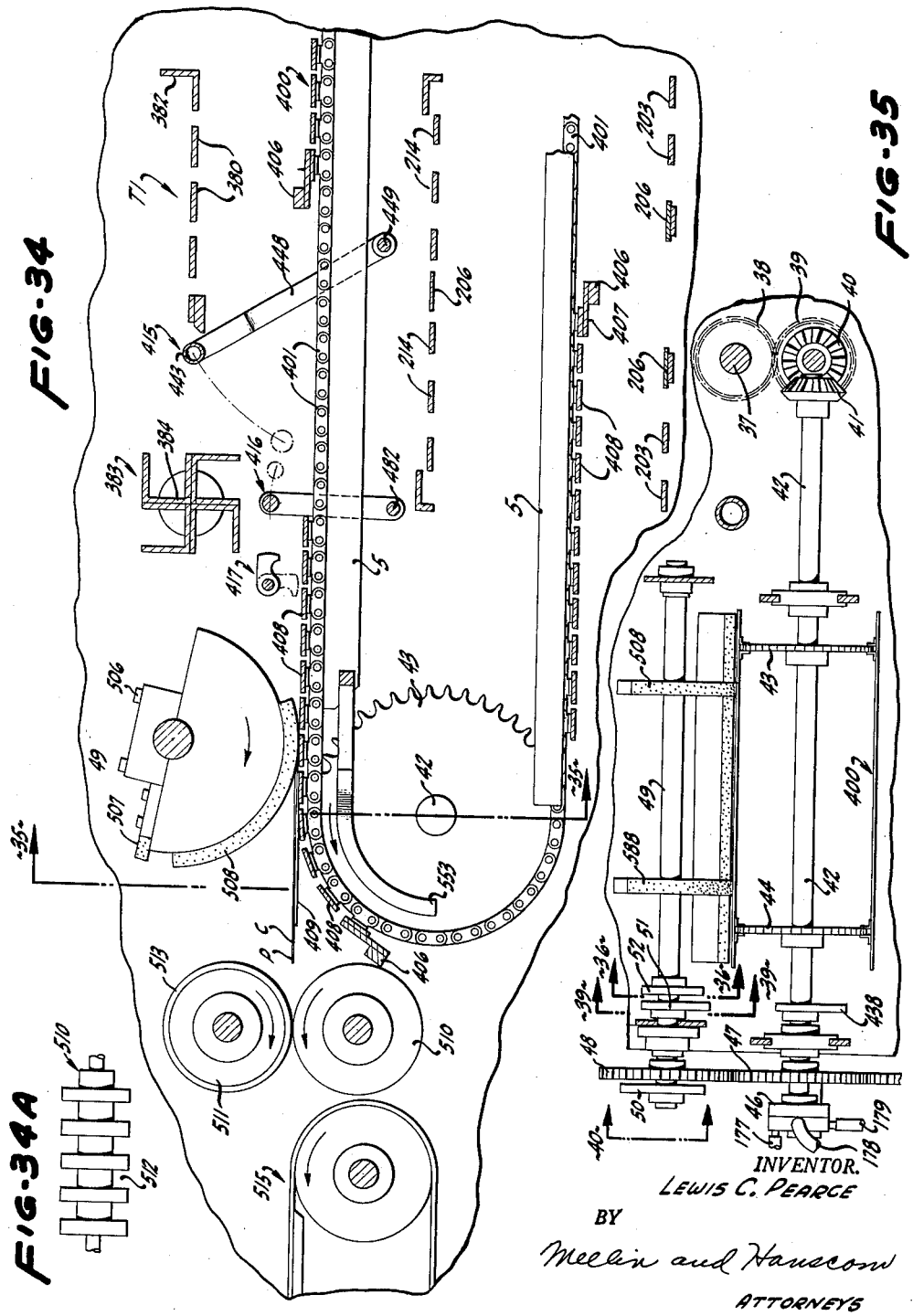
INVENTOR.
LEWIS C. PEARCE
BY
Meelin and Hauscom
ATTORNEYS

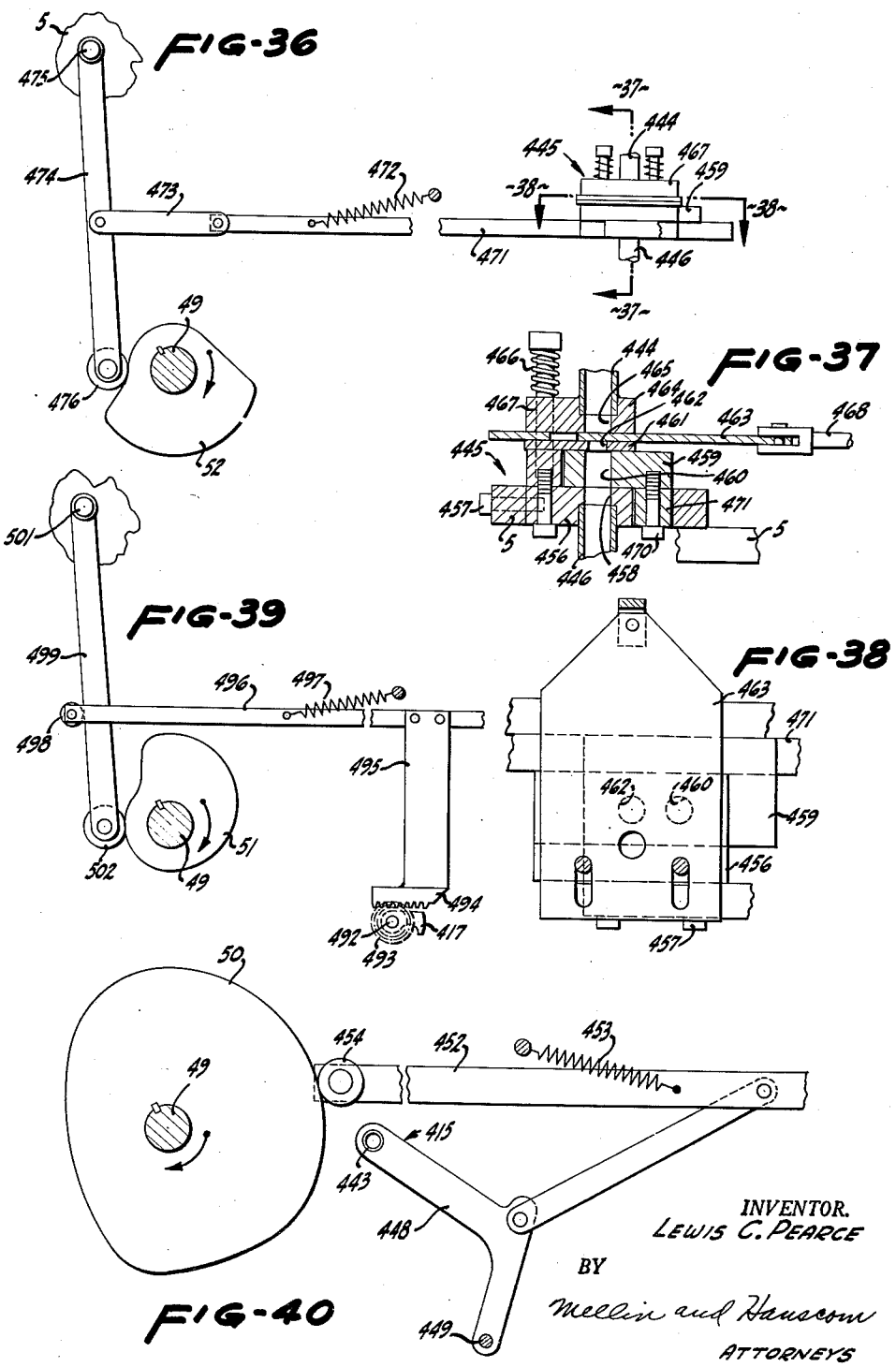

Sept. 25, 1962 L. C. PEARCE 3,055,656
COLLATION OF SHEET MATERIAL
Filed Sept. 21, 1959 19 Sheets-Sheet 19
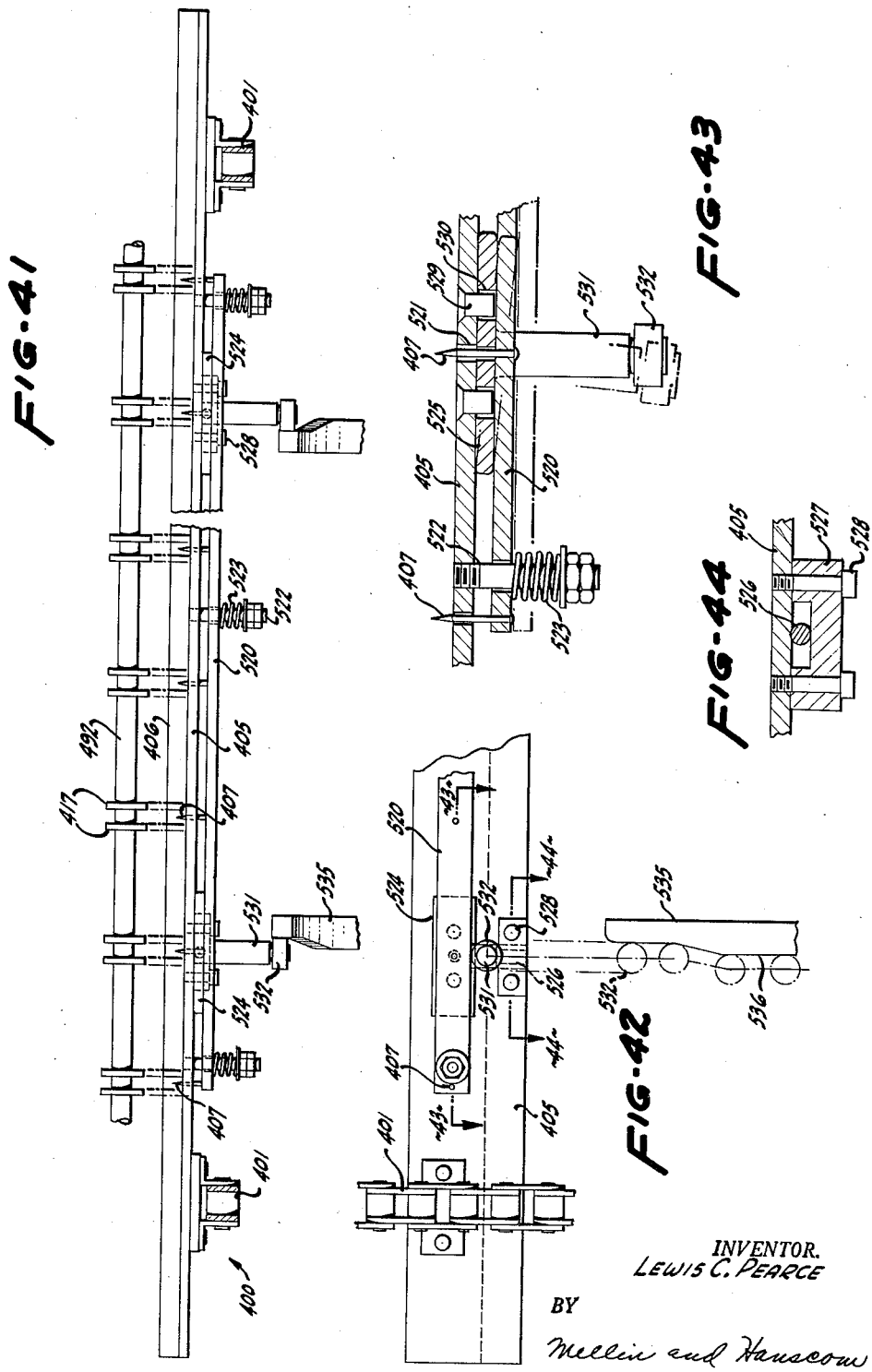
INVENTOR.
LEWIS C. PEARCE
BY
Mellin and Hanscom
ATTORNEYS United States Patent Office 3,055,656
Patented Sept. 25, 1962

3,055,656
COLLATION OF SHEET MATERIAL
Lewis C. Pearce, Columbia Township, Lorain County, Ohio, assignor to Pearce Development Company, Cleveland, Ohio, a corporation of Ohio
Filed Sept. 21, 1959, Ser. No. 841,110
32 Claims. (Cl. 270—58)

This invention relates to the collation of sheet material and more particularly to a novel method and apparatus for collating sheet material in which carbon sheets are interleaved between paper sheets.

In general, the machine described hereinafter operates automatically to produce collated packets of alternately arranged paper and carbon sheets of the type often encountered in use as business forms. The automatic handling of paper sheets is relatively easy due to the relative stiffness of such sheets, but automatic handling of carbon paper generally presents many difficulties due to the inherent flimsiness of such material. Once an individual piece of carbon paper is gripped by an operating mechanism of a machine, the sheet of carbon paper can be handled relatively easily. However, in multiple operation machines, it is usually necessary to transfer a sheet of carbon paper from one operating mechanism to another, which requires close synchronization of the mechanisms and gentle handling to avoid crumpling or tearing of the carbon paper. At the same time, automatic machinery must be built with a sufficient degree of ruggedness so as to diminish the need for continual adjustments of the mechanisms and to increase the operational life of the machine. Thus, if carbon sheets are to be handled, then the handling mechanisms should be fairly delicate, but if the machine is to be constructed in a rugged manner, then the delicacy of the handling mechanisms may be lost.

This difficulty is largely avoided by the present machine wherein the carbon paper is supplied in the form of a continuous web which is fed to one operating mechanism to be gripped thereby. After this gripping, the web is severed and a paper sheet is immediately applied and affixed to the severed carbon sheet. Thus, at this one mechanism, the carbon comes in as a continuous web which is relatively easy to handle in comparison to an individual carbon sheet and leaves attached to a relatively heavy sheet of paper.

An object of this invention is to provide a novel method and apparatus for forming a continuous carbon web into individual carbon sheets.

Another object of the invention is to provide a method and apparatus for feeding a continuous carbon web at a constant speed to a moving gripping mechanism in which the carbon web is severed to leave a carbon sheet attached to the gripping mechanism and to affix a paper sheet to the carbon sheet while the carbon sheet is held by the gripping mechanism.

A further object of the invention is to provide a machine in which paper and carbon sheets are fed to a continuously rotating set of rollers to be affixed together and in which the carbon sheets are formed from a continuous carbon web that is severed to form a sheet after the web has been fed to the rollers.

Still another object of the invention is to provide a machine for forming a plurality of sets of affixed-together sets of paper and carbon sheets as formed in the last object, said machine having means to superimpose the sets of sheets on one another to form a collated packet of paper sheets with interleaved carbon sheets.

A still further object is to provide a machine as set forth in the last object having a single power drive means to operate all of the component parts of the machine in timed synchronization with one another so that all operate simultaneously through a complete cycle during the time that the rollers complete one revolution.

Another object of the invention is to provide a collating machine as set forth in the preceding objects wherein the paper sheets can be printed with any desired indicia immediately before they are affixed to the carbon sheets.

Still another object of the invention is to provide a collating machine as set forth above which is easily adjusted to handle different lengths and widths of paper and carbon sheets.

Other objects and advantages will become apparent in the course of the following detailed description.

In the drawings, forming a part of this application, and wherein like parts are designated by like reference numerals, throughout the same, FIG. 1 is a schematic perspective view illustrating the manner in which the sheets of paper and carbon are collated.

FIGS. 3 and 4 are continuous front elevational views of a collating machine constructed in accordance with the invention.

FIG. 5 is an elevational view of the carbon feed drive mechanism as seen from the line 5—5 of FIG. 4.

FIG. 6 is a sectional view transverse to the axis of the machine illustrating the details of the paper sheet feed mechanism and of the paper-carbon collating rolls.

FIG. 7 is a sectional view taken on line 7—7 of FIG. 6.

FIG. 17 is a sectional view, with parts shown in elevation of the cam operation of the paper sheet stop operator, taken on line 17—17 of FIG. 3.

FIG. 18 is a sectional view, with parts shown in elevation of the cam operation of the paper sheet gripper operator, taken on line 18—18 of FIG. 3.

FIG. 19 is a detail, partially in section, of the spring-pressed rollers of the paper sheet conveyors.

FIG. 20 is a sectional detail, taken on line 20—20 of FIG. 19.

FIG. 21 is a detail, partly in section, of the apparatus for transferring the sheets of paper and carbon from the stationary trays of the machine to the main conveyor.

FIG. 22 is a sectional view, taken on line 22—22 of FIG. 21, and further showing the cam operation of the mechanism shown in FIG. 21.

FIG. 23 is a side elevational view of the carbon feed apparatus of the machine.

FIGS. 24, 25 and 26 are sectional views of the carbon feed apparatus, taken on lines 24—24, 25—25 and 26—26 of FIG. 23, respectively.

FIG. 27 is a sectional detail of the lock mechanism for the carbon feed apparatus, taken on line 27—27 of FIG. 25.

FIG. 28 is a sectional detail of the adjustment mechanism for the carbon feed apparatus of FIG. 23.

FIG. 29 is a sectional view of the carbon feed apparatus taken on line 29—29 of FIG. 23.

FIGS. 30 and 31 are operational views of the cutting device of the carbon feed apparatus illustrated in FIG. 23.

Figure 8:
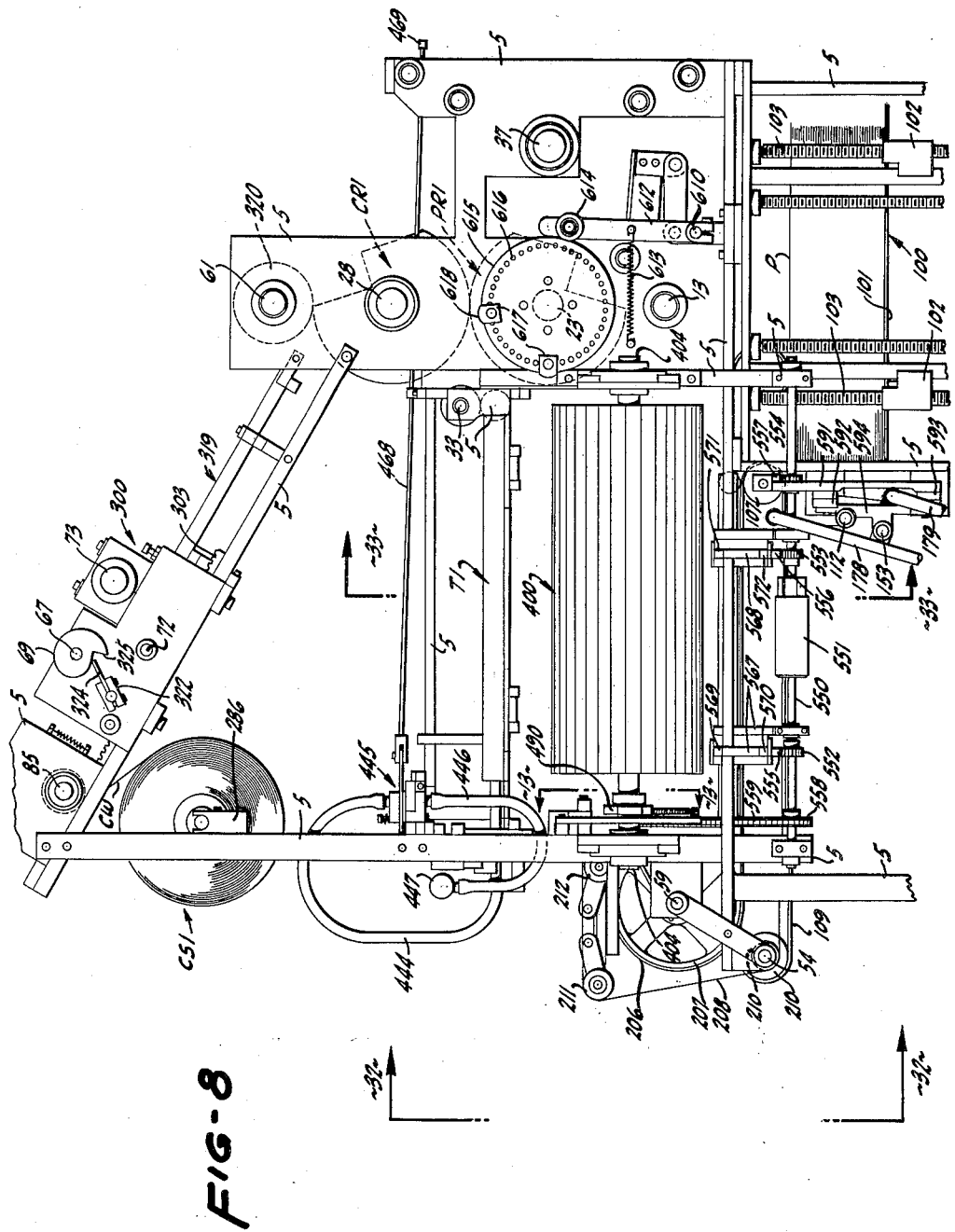
FIG. 8 is an end elevational view of the machine, as seen from the left side of FIG. 3.
Figure 32:
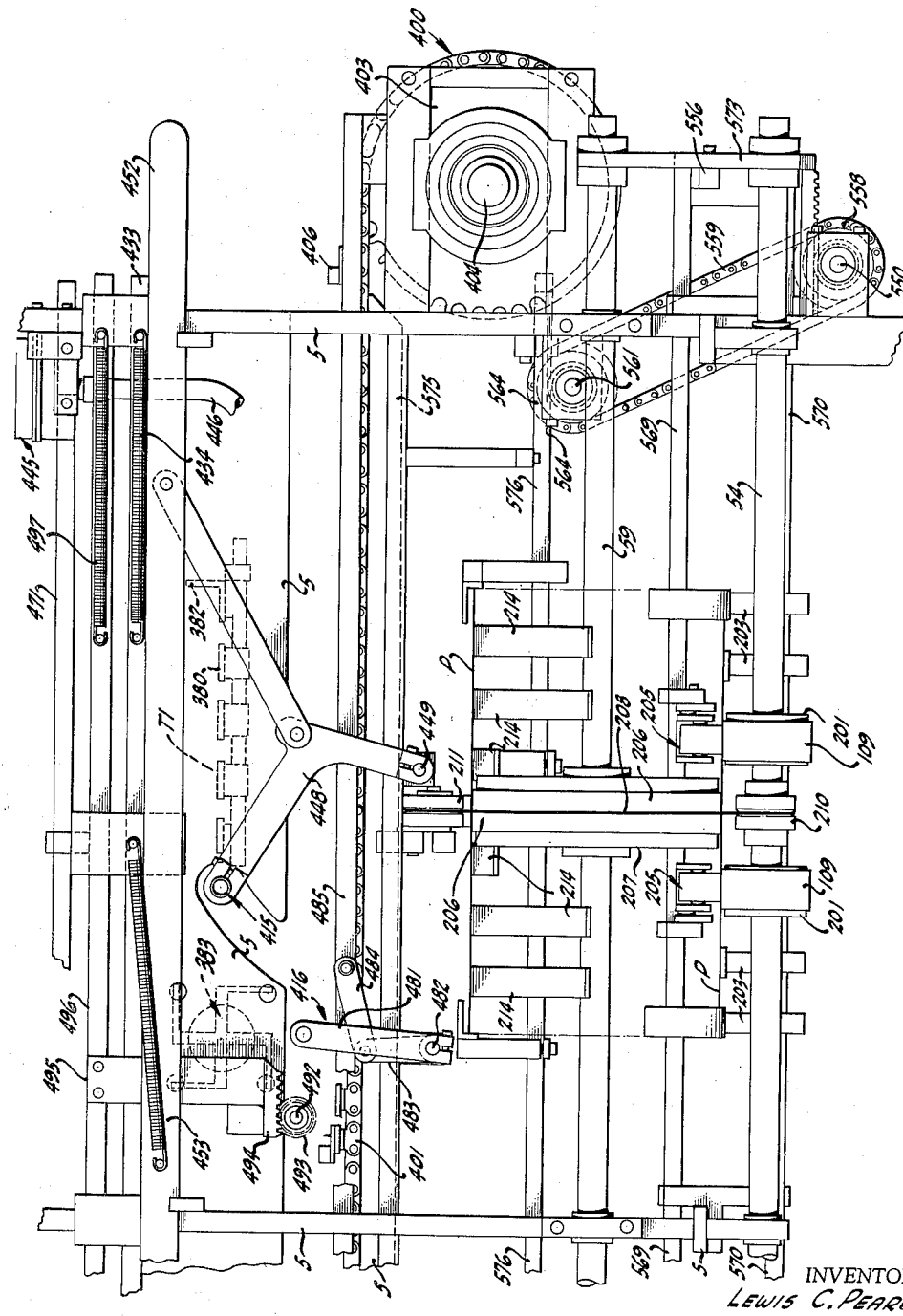

FIG. 32 is a rear elevational view of the machine, as seen from the line 32—32 of FIG. 8.

FIG. 33 is a sectional view of the machine taken on the line 33—33 of FIG. 8.

FIG. 34 is an elevational view illustrating the details of the mechanism for pressing the collated paper and carbon sheets together and for removing same from the conveyor.

FIG. 34A is an elevational detail of one of the nipper rollers of FIG. 34.

FIG. 35 is a sectional view transverse to the axis of the machine, taken on the line 35—35 of FIG. 34.

FIG. 36 is an operational view of the cam operation of the vacuum slide valve operator for the transfer tube, as seen generally from line 36—36 of FIG. 35.

FIGS. 37 and 38 are sectional views of the vacuum slide valve for the transfer tube, taken on lines 37—37 and 38—38 respectively of FIG. 36.

FIGS. 39 and 40 are operational views of the cam operation of the presser feet and transfer tube operators, taken generally on lines 39—39 and 40—40 of FIG. 35.

FIG. 41 is a sectional view of the conveyor transverse to its length illustrating the manner in which the holding pins may be retracted.

FIG. 42 is a bottom view of a portion of the conveyor depicted in FIG. 41.

FIGS. 43 and 44 are sectional views of the pin retracting mechanism of FIG. 42, taken on lines 43—43 and 44—44 respectively thereof.

In general, a machine built in accordance with the present invention operates to produce a collated assembly of paper and carbon sheets in which a number of paper sheets are separated by carbon sheets and in which all of the sheets are glued together to form a packet.

Figure 1:
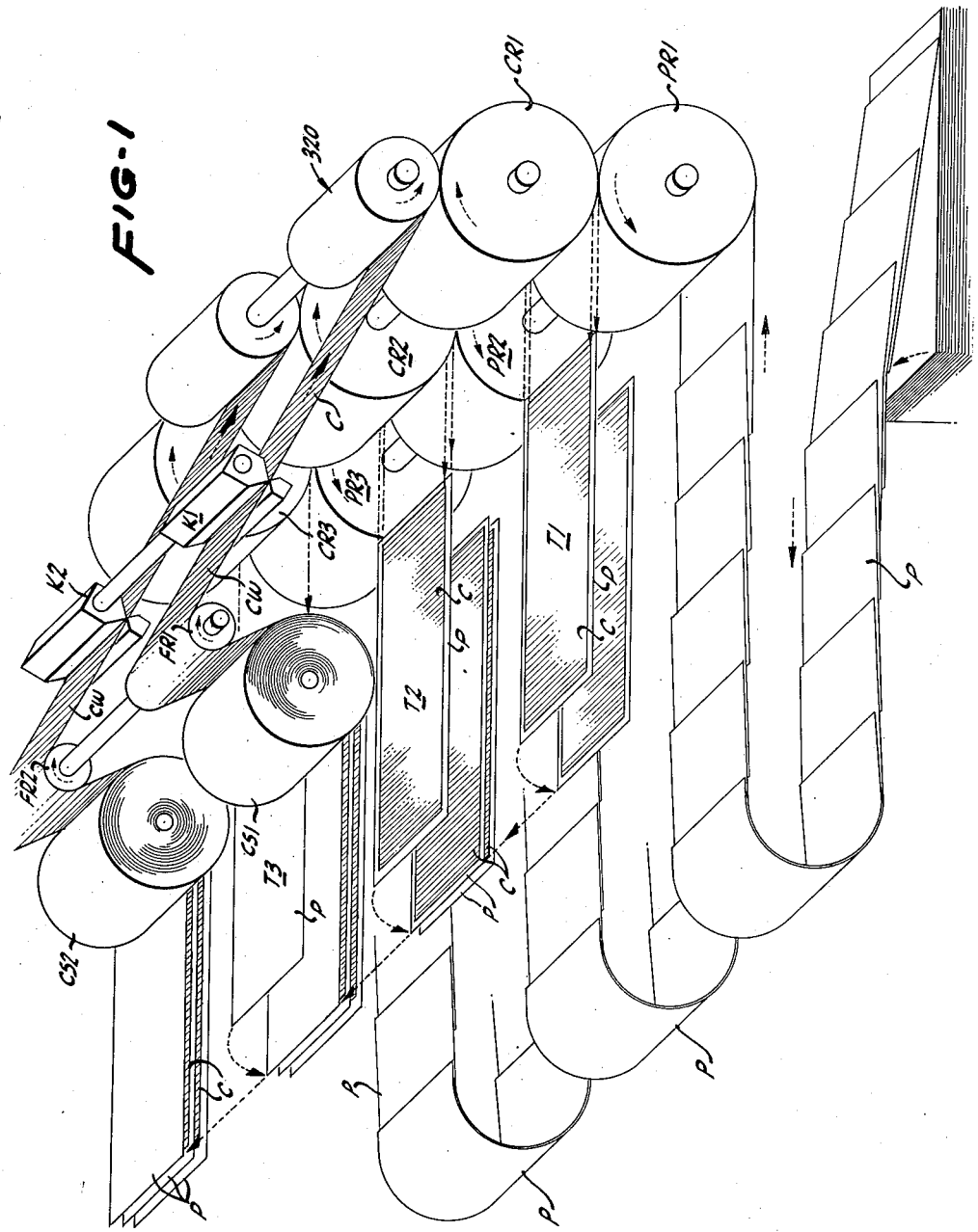

To best illustrate the operation of assembly and collation of the sheets, reference should be made to FIG. 1, wherein packets of three paper and two carbon sheets are formed. Stacks of paper sheets P, cut to the desired size are delivered to the machine and placed in three feed hoppers. The machine then feeds paper sheets from the feed hopper to paper sheet conveyors which deliver the paper sheets one by one to the paper rolls PR1, PR2 and PR3. Each of the three paper rolls has a paper sheet delivered to it simultaneously.

At the same time, carbon paper is delivered in the form of continuous webs CW from two carbon supply rolls CS1 and CS2, by feed rollers FR1 and FR2 and fed to the carbon rolls CR1 and CR2. As the carbon webs are delivered to the carbon rolls, the knives K1 and K2 sever the webs into individual carbon sheets C.

The carbon and paper sheets, C and P, are passed around and between the carbon and paper rolls CR1 and PR1 and delivered to a stationary tray as at T1. During this process, the paper sheet has two strips of glue applied along one side thereof, with the carbon sheet being glued to the paper sheet by one of these glue strips, leaving the other glue strip exposed. The paper sheet is also perforated along the glued side thereof.

Simultaneously, a second set of carbon and paper sheets are passed around and between the carbon roll CR2 and paper roll PR2 and ejected into a stationary tray T2. The paper sheet is also glued and serrated as above. A third paper sheet is also fed between the carbon roll CR3 and paper roll PR3 and delivered to a stationary tray at T3. This last paper sheet is serrated but is not glued.

The two glued sets of carbon and paper sheets and the one unglued paper sheet are then simultaneously transferred from the trays T1, T2 and T3 to an endless conveyor traveling continuously therebeneath in the direction of the solid arrows. On the next cycle of the machine, the sheets will be transferred to the conveyor from trays T1, T2 and T3 such that the sheets will register with the sheets previously placed on the conveyor. That is, the sheets on the conveyor will be moved thereby from adjacent one tray to adjacent the next tray in one cycle of operation. Thus, the sets of carbon and paper sheets from tray T1 will always start a new assembly, the sets of carbon and paper sheets from tray T2 will always be placed upon the sets previously placed on the conveyor from tray T1, and the single paper sheet from tray T3 will alawys complete an assembly. The assembled sets are then pressed together to complete the gluing operation and are delivered to point of use for any later operations desired such as packaging, slitting, printing or the like.

As is seen from the foregoing, the machine comprises three generally identical units 1, 2 and 3 in which unit 1 operates to feed paper and carbon sheets to tray T1, unit 2 operates to feed paper and carbon sheets to tray T2 and unit 3 operates to feed paper sheets to tray T3. These three units are shown in detail in FIGS. 3 and 4 which are front views of the machine. The units are all disposed in side by side relationship on a common frame generally indicated by the reference numeral 5, and the operating mechanisms of each unit are all driven from a single power drive source as will be described. The number of units 1, 2 and 3 is determined by the number of sheets desired to be collated and greater or fewer units may be used as desired. However, in any event, all units will be driven by the single power source with corresponding elements in the units being operated simultaneously.

In order that the frame elements be readily ascertained in the various figures of the drawings, the reference numeral 5 is used to indicate all of the rigidly interconnected frame elements, with additional reference numerals being used for specific frame elements as necessary for a clear disclosure of the invention.

Figure 2:
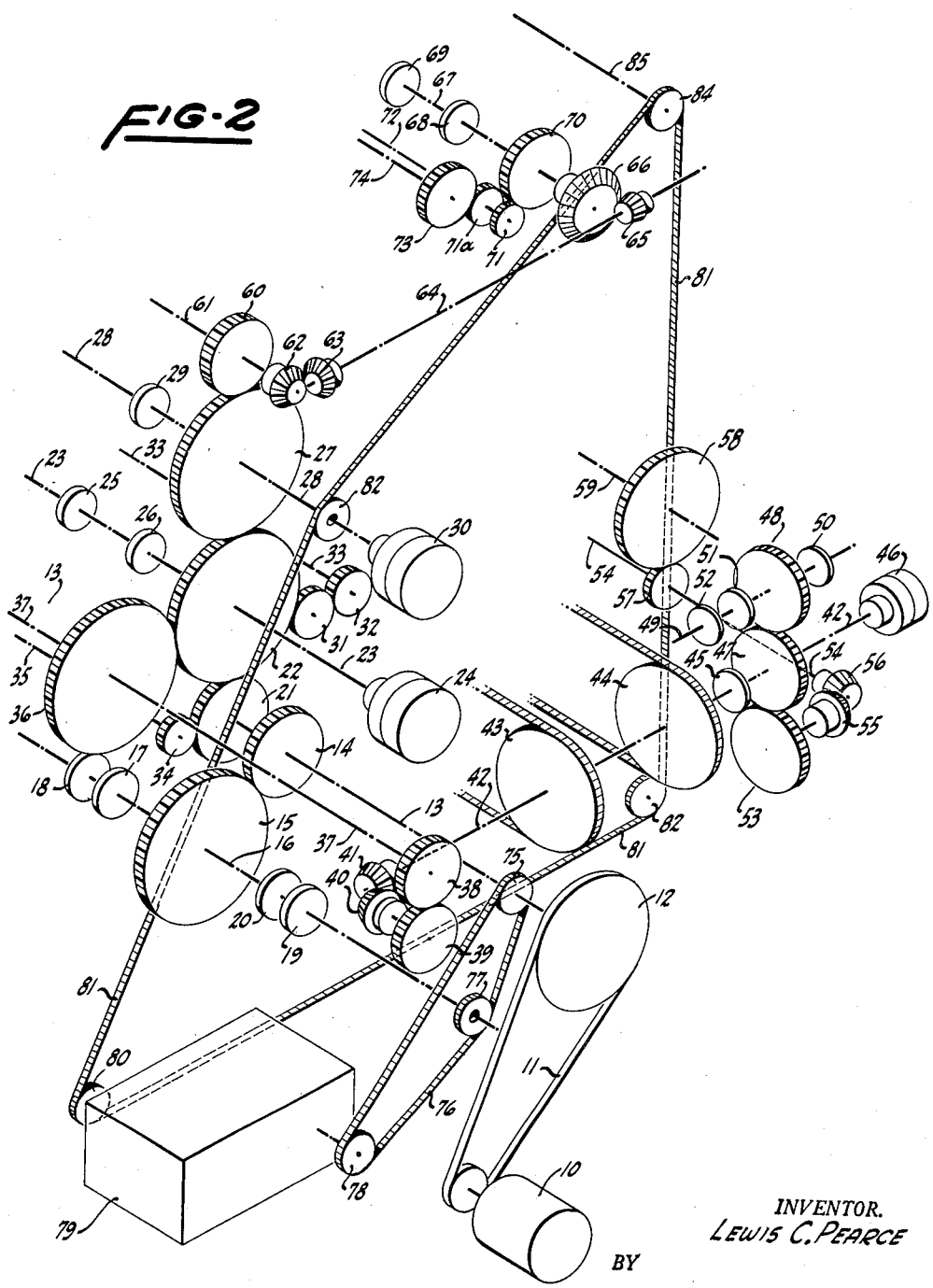
FIG. 2 is a schematic representation of the interconnected drive assembly for the collating machine.

In order that the inter-relationship of the various mechanisms of the machine may be made more clear, reference is now made to FIG. 2 wherein is illustrated in a diagrammatic fashion the manner in which the various mechanisms are all driven from a single power source so that they will all operate in synchronism with one another. The relationship of most of the following drive elements may also be seen in the detailed views of FIGS. 3 and 4.

The single main drive motor 10 is coupled by drive belt 11 to pulley 12 mounted on shaft 13. Meshing gears 14 and 15 transmit rotation to camshaft 16, having the paper feed pickup cams 17 and 18 and paper feed transfer cams 19 and 20 thereon. Gear 21, on shaft 13, transmits power through gear 22 to the hollow drive shaft 23 which operates the paper rolls PR1, PR2 and PR3. A rotary slide valve 24 rotates with shaft 23 which shaft also has paper sheet stop cam 25 and paper sheet gripper cam 26 fixed thereto.

Gear 22 meshes with gear 27 which is fixed to hollow drive shaft 28 to rotate the carbon rolls CR1, CR2 and CR3 in synchronism with the paper rolls. Shaft 28 has cam 29 mounted thereon which is used in connection with the transfer of the carbon and paper sheets from the carbon and paper rolls to the trays T1, T2 and T3. A rotary slide valve 30 is also fixed to shaft 28 for rotation therewith. Gear 22 is also in mesh with idler gear 31 and gear 32 to transmit rotation to the drive shaft 33 for transferring the paper and carbon sheets to the trays T1, T2 and T3.

Gear 21 is also in mesh with gear 34 to drive the gummer drive shaft 35.

Gear 22 meshes with gear 36 to drive the printing roll drive shaft 37. The rotation of this last shaft is coupled by gears 38, 39, 40 and 41 to the main conveyor drive shaft 42 which has the conveyor sprockets 43 and 44 secured thereto. In addition, the conveyor drive shaft 42 has index cam 45 and rotary slide valve 46 secured thereto, the latter element being used to control the vacuum in the paper sheet pickup and transfer heads.

Gear 47, on conveyor drive shaft 42, meshes with gear 48 to drive camshaft 49. This latter shaft has cams 50, 51 and 52 thereon which are used in the mechanism for transferring sheets from the trays T1, T2 and T3 to the main conveyor. Gear 47 is also in mesh with gear 53 to drive the paper sheet lower conveyor drive shaft 54 through bevel gears 55 and 56. Gear 57 on the last named shaft meshes with gear 58 to drive the paper sheet upper conveyor drive shaft 59.

Returning to gear 27, this gear is in mesh with gear 60 to drive the carbon pressure rolls drive shaft 61. Bevel gears 62 and 63 transmit this rotation to shaft 64 to bevel gear 65. This latter gear is free to slide axially on shaft 64 while remaining in mesh with gear 66 to rotate shaft 67. Cam shaft 67 carries anvil cam 68, slack cam 69 and gear 70 thereon. Gear train 71, 71a and 73, rotates the knife drive shaft 74. Gears 71 and 71a are fixed to the drive shaft 72 for rotation thereof.

Returning to the input drive shaft 13, gear 75 thereon drives chain 76 trained around idler gear 77, to drive the input sprocket 78 of the adjustable variable speed transmission device 79. The details of this latter device have not been illustrated since any commercially available variable transmission may be used as long as the output to input speed ratio thereof can be varied as desired. The output sprocket 80 of the variable transmission device drives chain 81, trained around idler sprockets 82 and 83, to drive sprocket 84 fixed to the carbon feed rollers drive shaft 85.

The following chart has been prepared in order to aid in showing which elements of the machine are operated by the various driven shafts of the above described power drive mechanism. These operated elements will be described in full detail hereinafter.

| Shaft | Mechanism driven by shaft | Cam on shaft | Mechanism driven by cam |
|---|---|---|---|
| 13 | Paper gripper rolls 242. | | |
| 16 | | 17, 18 | Paper sheet pickup 105. |
| | | 19, 20 | Paper sheet transfer 106. |
| 23 | Paper rolls PR1, PR2, PR3. | 25 | Paper stop 226. |
| | Slide valve 24 for paper rolls. | 26 | Paper gripper 243. |
| 28 | Carbon rolls CR1, CR2 slide valve 30 for carbon rolls. | 29 | Tray press down roller 370. |
| 33 | Tray entry rollers 366. | | |
| 35 | Gummer wheel 262. | | |
| 37 | Printing roll 285. | | |
| 42 | Main conveyor 400. | 45 | Swastika guides 383. |
| | | 46 | Slide valve for paper sheet pickup 105 and transfer 106. |
| 49 | Pressure bar roller 505. | 50 | Transfer tubes 415. |
| | | 51 | Presser feet 417. |
| | | 52 | Slide valves 445 for transfer tubes 415. |
| 54 | Lower paper sheet conveyors 109. | | |
| 59 | Upper paper sheet conveyors 206. | | |
| 61 | Pressure rollers 320 associated with carbon rolls. | | |
| 67 | | 68 | Anvils 318. |
| | | 69 | Slack rollers 316. |
| 72 | Carbon feed rollers 317 on carriage 300. | | |
| 74 | Knives K1, K2. | | |
| 85 | Carbon feed rollers FR1, FR2. | | |

*The Paper Sheet Feeding Mechanism*

Referring now to FIGS. 2, 6, 8, 9, 10, 11, 12, 14 and 15, the precut sheets of paper P are brought to the front of the machine and stacked in the paper sheet hoppers, generally indicated by the reference numeral 100. The hoppers are comprised by a removable plate 101 to support the paper sheets, the plate being supported by elevator members 102 mounted on screws 103. As is common in these devices, a motor (not shown) is used to rotate the screws 103 in response to variations in the stack height to maintain the top of the stack of sheets at the level shown in the drawings.

Figure 9:
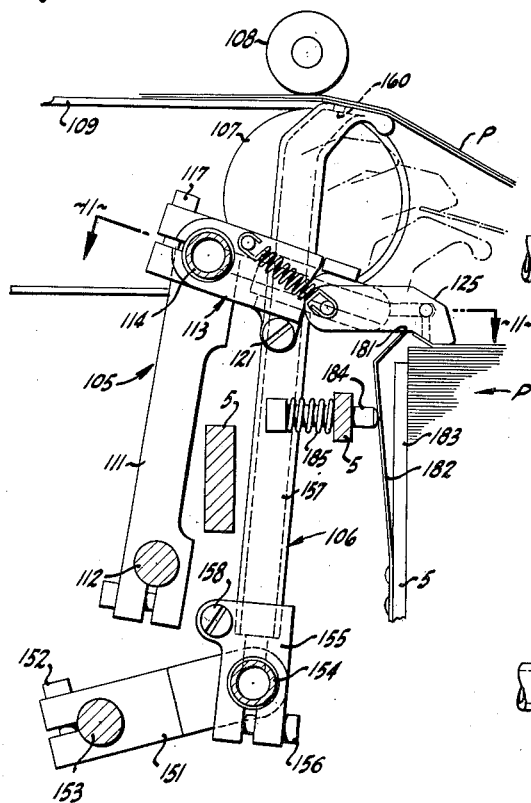
FIG. 9 is an elevational detail, partially in section of the apparatus to remove the paper sheets from their feed hopper.
Figure 10:
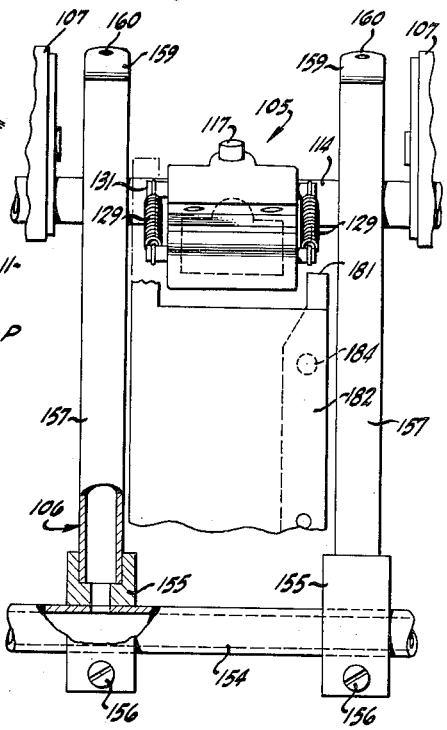
FIG. 10 is an elevational view of the apparatus of FIG. 9 as seen from the right side thereof.
Figure 11:
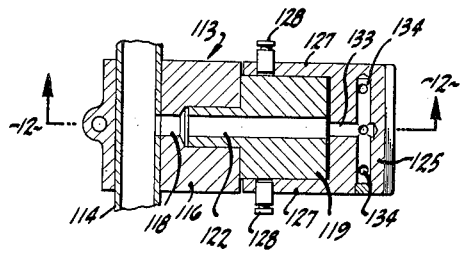
FIG. 11 is a sectional view of FIG. 9, taken on line 11—11 thereof, illustrating the details of the paper sheet pickup head.
Figure 12:
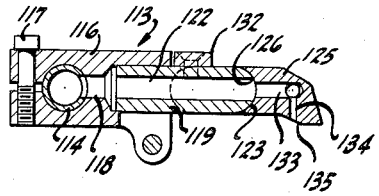
FIG. 12 is a sectional view taken on line 12—12 of FIG. 11.

A pickup mechanism 105 and a transfer mechanism 106 serve to pick up the uppermost paper sheet and deliver it between the rollers 107 and 108 to the two paper sheet conveyor belts 109, as best illustrated in FIG. 9.

The pickup mechanism 105 comprises a lever part 111 secured to shaft 113 journaled in frame 5 and a vacuum head member 113 secured to vacuum tube 114 which is rotatable in the other end of lever 111.

The head member 113 comprises a holder 116 clamped to vacuum tube 114 by bolt 117 and having a passage 118 therein in communication with the interior of tube 114. The removable insert 119 is clamped in holder 116 by bolt 121 and has a passage 122 therethrough from passage 118 to the convex spherical end-surface 123. Head element 125 has a concave spherical surface 126 in engagement with insert surface 123 and rearwardly extending wings 127 having pins 128 therein. Springs 129, secured between the pins 128 and pins 131 on the holder 116, maintain the head element 125 engaged with the insert 119. As is seen in the drawings, the springs 129 tend to rotate the head element 125 in a clockwise direction on insert 119, with the rotation being limited by the engagement of head 125 with the stop 132 secured to the insert 119. At the same time, the head 125 can rotate in a counterclockwise direction, relative to insert 119, against the bias of springs 129. Head 125 has a passage 133 in communication with insert passage 122 and pickup ports 134 which extend to the pickup face 135 of the head 125. The insert passage 122 is larger in diameter than head passage 133, so that these passages will be in full communication with one another in spite of variations in the angular positions therebetween illustrated in FIGS. 9 and 12.

By means of the above construction, the holder 116 can be in the position shown in FIG. 9 and the head 125 can be in contact with the top sheet of paper P in spite of relatively large variations in the height of the top sheet.

Figure 15:
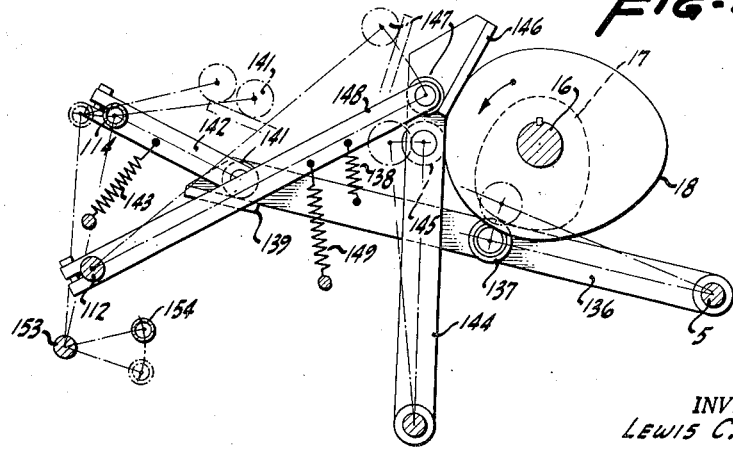
FIG. 15 is a schematic illustration of the cam operation of the paper sheet pickup head operators, as seen generally from line 15—15 of FIG. 4.

The mechanism for operating the pickup mechanism 105 is shown in FIG. 15. Lever 136, pivoted to frame 5, has a cam roller 137 thereon held in engagement with cam 17 by spring 138. Cam 17 is fixed to cam shaft 16 for rotation therewith as before described in connection with FIG. 2. Lever 136 has a plate 139 on the other end thereof engaged by roller 141 on lever 142 which is fixed to vacuum tube 114. Spring 143 holds roller 141 in contact with plot 139. As cam 17 rotates, levers 136 and 141 will rotate between the positions illustrated in full and dotted lines, to oscillate the head member 113 between the full and dotted line positions in FIG. 9.

Lever 144, pivoted to frame 5, has a cam roller 145 thereon in engagement with cam 18 and an end plate 146 engaged by roller 147 on lever 148 clamped to shaft 112. Spring 149 biases lever 148 into engagement with lever 144 and biases lever 144 into engagement with cam 18. As cam 18 rotates, lever 148 will be rotated between the full and dotted line positions of FIG. 15, to produce a corresponding oscillatory movement of lever 111 between the full and dotted line positions indicated in FIG. 9.

The transfer mechanism 106 comprises a lever 151 clamped by bolt 152 to shaft 153 journaled for rotation in frame 5. Vacuum tube 154 is free to rotate in the other end of lever 151 and has two holders 155 clamped thereto by bolts 156. Hollow transfer tubes 157 are secured in holders 155 by bolt 158, and each transfer tube has a flattened end 159 provided with port 160 therethrough.

Figure 14:
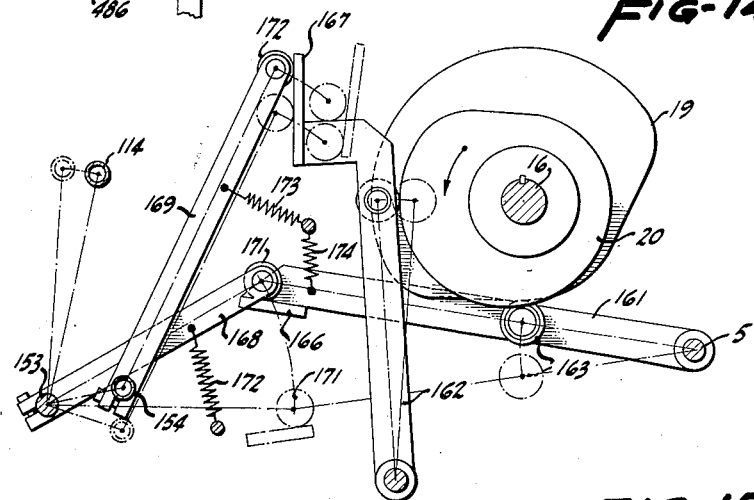
FIG. 14 is a schematic illustration of the cam operation of the paper sheet pickup transfer head operators, the view being that generally along line 14—14 of FIG. 4.

The mechanism for operating the transfer mechanism 106 is illustrated in FIG. 14. Levers 161 and 162 each pivoted to frame 5 have cam rollers 163 and 164 thereon engaged with cams 20 and 19 respectively, and end plates 166 and 167. Levers, 168 and 169, secured to shaft 153 and vacuum tube 154 respectively, have cam rollers 171 and 172 thereon engaged with end plates 166 and 167 respectively, and springs 173, 174 and 175 hold the levers in engagement with one another and in engagement with cams 19 and 20. As cams 19 and 20 rotate, levers 168 and 169 will be oscillated between the full and dotted line positions shown in FIG. 14 so as to produce a corresponding oscillation of the lever 151 and transfer tube 158 between the full and dotted line positions of FIG. 9.

As indicated in FIGS. 2 and 35, a conventional rotary slide valve 46 rotates with conveyor drive shaft 42. An inlet hose 177 is connected to valve 46 from a vacuum source (not shown) and outlet hoses 178 and 179 are connected from the valve 46 to the vacuum tubes 114 and 154 of the pickup and transfer mechanisms. The valve 46 acts to place the pickup and transfer mechanisms at sub-atmospheric pressure for a desired portion of their cycles of operation as described below. Since such slide valves are conventional units it is not thought necessary to describe the details thereof.

In the operation of the pickup and transfer mechanisms 105 and 106, the initial positions of the elements may be considered as that shown in full lines in FIGS. 9 and 14. At this time, vacuum is applied to head 125 causing the rear edge of the top paper sheet P to be sucked up against the face 135 of head 125. Transfer tube 157 also has vacuum applied thereto to hold the previously picked up paper sheet and is feeding this sheet between the rolls 107 and 108 to the lower paper sheet conveyor 109.

The pickup head 125 will now swing up to the dotted line position of FIG. 9, due to the rotation of vacuum tube 114. During this time, the transfer tube 157 will have the vacuum thereto cut off by valve 46 to release the paper sheet and the head of the transfer tube will move downwardly because of the rotation of shaft 153 and will move to the right by the rotation of tube 154 so that it will assume a position below the paper sheet held by the pickup head 125, as shown in dotted lines.

Vacuum will now be applied to the transfer tube 157 and will be cut off from the pickup head 125 so that the sheet will now be gripped by the transfer tube. The pickup head will now be moved to the left by rotation of shaft 112, so that it is out of the way of the movement of the paper sheet as it is carried by the transfer tube 6 to the full line position of FIG. 9 to complete its cycle of movement.

The cycle of operation of the pickup head is completed by rocking shaft 112 back to its original position and by rocking tube 114 back to its original position, the latter movement causing the head 125 to be lowered down on the uppermost paper sheet, at which time vacuum is again applied thereto.

Thus, as described, each head of the pickup and transfer mechanisms travels in a generally quadrilateral path so as to clear the way for each other to move the sheets of paper from the hopper to the lower paper sheet conveyor 109. Such movement is of course necessary because the paper sheets are picked up from their top surface but are delivered to the conveyor from their lower surface.

At times, the sheets of paper may stick slightly to one another as the uppermost sheet is being removed from the hopper. In order to insure that only a single sheet is removed at a time, the edge of the sheet is flicked by the edge 181 of the resilient stripper 182 as the sheet is sucked up against the pickup head 125. The stripper 182 is mounted on the rear wall 183 of the hopper 100 and is adjusted into a proper position by screw 184. Spring 185 holds the screw 184 in adjusted position.

A weight bar 186, pivoted at 187, provides a slight drag on the paper sheets as they are removed from the hopper to facilitate such withdrawal.

The roller 108 is spring-pressed against conveyor belt 109 in a manner as shown in the detail drawings FIGS. 19 and 20. Roller 108 is mounted between plates 188 and 189 which are freely pivoted to shaft 190. Bolt 191 secured shaft 190 rigidly to rails 192 and 193. A leaf spring spring holder 194 is also rotatably mounted on shaft 190 but is rigidly secured thereto by setscrew 195 after adjusting the holder so that the leaf spring 196 exerts the desired force on stop 197 to press the roller 108 downwardly.

Figure 16:
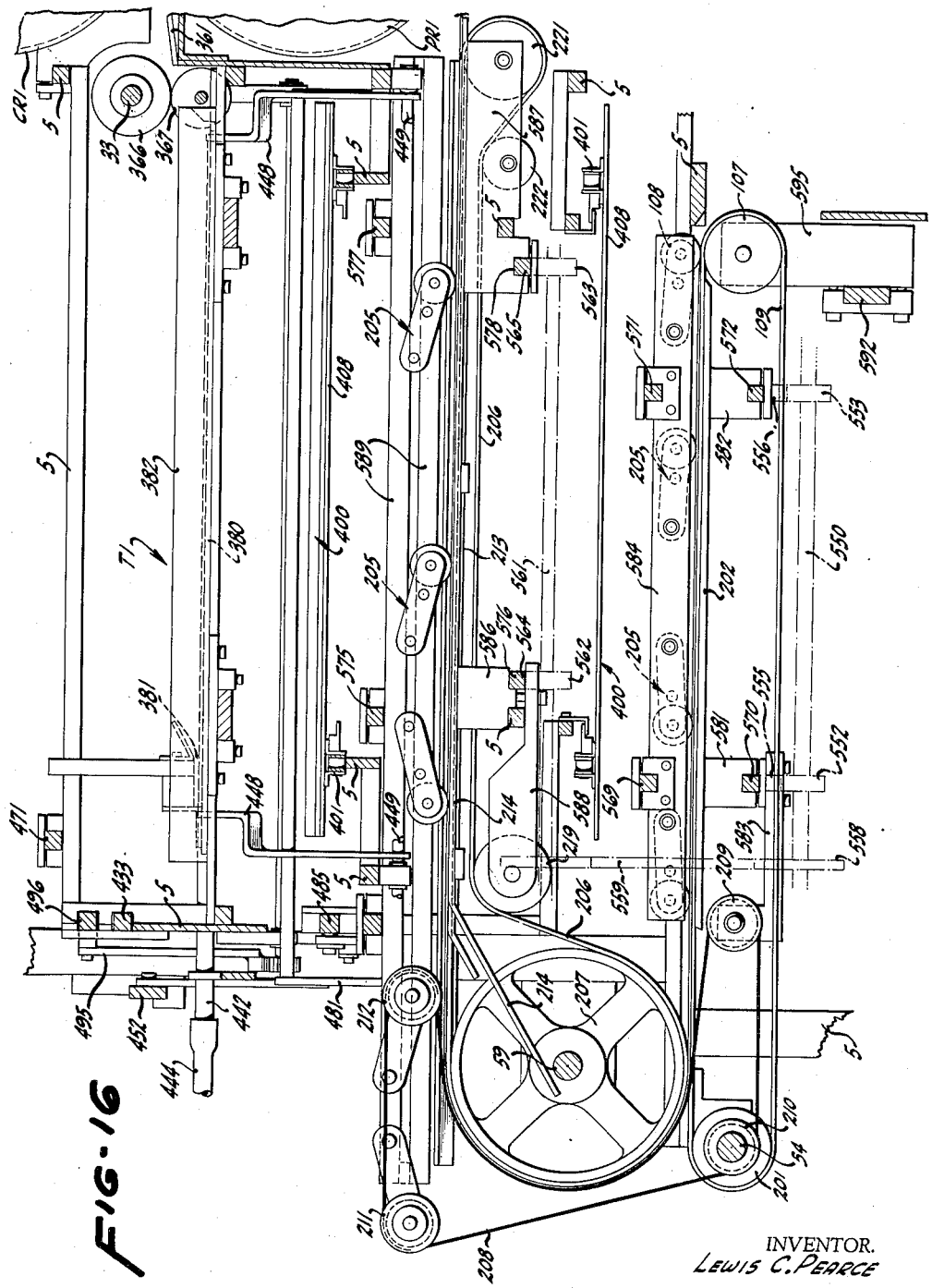
FIG. 16 is a sectional view taken transverse to the length of the machine and illustrating the details of the paper sheet conveyors.

The conveyor belts 109, which pass around idler rollers 107, are driven by rollers 201 fixed to the lower paper conveyor drive shaft 54, as best seen in FIG. 16, and the upper flights of the conveyor belts slide along the rails 202. Additional rails 203, parallel to rails 202, are provided to support the paper sheets as they are moved by conveyor 109.

The paper sheets are held on the conveyor belt by a plurality of spring-pressed roller units 205 identical to that shown in detail in FIGS. 19 and 20. As the paper sheets move on the conveyor belts to the rear ends thereof, they come into contact with the conveyor belt 206 trained around wheel 207 mounted on drive shaft 59 for rotation thereby. The paper sheets are thus transferred from the lower paper sheet conveyor belt 109 to the upper paper sheet conveyor belt 206 for travel back through the machine. The paper sheets are held against wheel 207 by endless cable 208 trained around idler pulleys 209, 210, 211 and 212, the latter two pulleys being spring-pressed to hold the cable 208 tightly against the periphery of the conveyor belt 206 as it travels with wheel 207, so that the paper sheets will not shift relative to one another as they are transferred from conveyor belt 109 to conveyor belt 206.

The upper flight of conveyor belt 206 is supported by rail 213 and the paper sheets are held firmly thereagainst by more spring-pressed rollers 205. Additional paper supporting rails 214, parallel to rail 213, are provided. These rails having extensions 215 integral therewith and extending rearwardly thereof to prevent the proper sheets from fouling with driveshaft 59 or other mechanism as the sheets are transferred to the upper flight of conveyor 206.

The conveyor belt 206 is trained around the idler rollers 219, 221 and 222, as illustrated in FIG. 16.

As the paper sheets P reach the forward end of the conveyor 206 (FIG. 6) they are projected onto guide plate 224 and come to rest against the stop face 225 of stop member 226 when this member is in its dotted line position illustrated in FIG. 6. The paper sheet is now in position to be picked up by the paper roll PR1.

The paper roll PR1 comprises two segments 231 and 232 clamped together by bolts 233 and keyed by key 234 to the hollow drive shaft 23 for rotation therewith. The outer periphery of the paper roll is provided with a rubber pad 235. A radial web 236 of segment 231 is provided with passages 237 to place the interior of shaft 23 in fluid communication with the pickup ports 238 which are spaced along the length of the paper roll PR1. As has been mentioned previously, shaft 23 has a rotary slide valve 24 mounted thereon which is connected by hose 239 (FIG. 4) to a vacuum source (not illustrated). The valve 24 is conventional and supplies shaft 23 with vacuum during a desired portion of the cycle of rotation thereof, as described below. The paper roll is also provided with a plurality of generally circumferentially disposed fingers 241 secured thereto which extend between the ends of the rubber pad 235 and serve to prevent the paper sheet from fouling with the paper roll.

Associated in operation with the paper roll PR1 are the paper gripper rolls 242 and the paper gripper 243. The paper gripper rolls 242 (FIGS. 6 and 7) are rigidly secured to drive shaft 13 for rotation therewith, and rotate through a full cycle in the same length of time that the paper roll PR1 rotates through one revolution.

The paper gripper 243 (FIGS. 6 and 18) comprises a leaf spring 244 secured to shaft 245. This latter shaft is oscillated by means of lever 246 secured thereto which carries pawl 247 thereon. Pawl 247 is urged by spring 248 in a clockwise direction against stop 249, and spring 251 forces pawl 247 against stepped cam 26 which rotates with the paper roll drive shaft 23. As is apparent, the leaf spring 244 is rotated out of contact with the paper sheets P for most of the cycle of rotation of shaft 23. The pawl arrangement of lever 246 is used in case it is desired to turn shaft 23 in a clockwise direction. If pawl 247 were fixed to lever 246, the abrupt step 252 of cam 26 might shear off the pawl upon clockwise rotation of cam 26.

The paper stop 226, fixed to shaft 253, has lever 254 secured thereto (FIG. 17). This lever is secured by link 256 to lever 257 which pivots about the frame 5 and is held against cam 25 by spring 258. As cam 25 rotates, the above linkage imparts an oscillatory movement to shaft 253 and to paper stop 226 to move the paper stop between the full and dotted line positions indicated in FIG. 6.

The operation of the above mechanisms can best be described by assuming the paper roll PR1 to be backed off about 90° (clockwise in FIG. 6). At that time the paper stops 226 will be in their dotted line positions between paper roll fingers 241 to stop the paper sheets in position to be picked up by the paper roll PR1. As the paper roll rotates in the counterclockwise direction driven by drive shaft 23, the paper gripper leaf spring 244 will move down into engagement with the paper sheet P and the paper stop 226 will rotate down to the full line position of FIG. 6. When the pickup ports 238 of the paper roll PR1 come to the position illustrated in FIG. 6, the paper gripper rolls 242 will press the paper sheet against the paper roll and rotary slide valve 24 will apply vacuum to the drive shaft 23 and the pickup ports 238. The leading edge of the paper sheet is thus securely held against the paper roll as it continues to rotate. The paper gripper leaf spring 244 snaps upwardly as the sheet is picked up by the paper roll so that the paper roll pulls the sheet freely therewith.

As the sheet moves with the paper roll PR1 it has two strips of glue applied along a side edge thereof by the gummer apparatus 260, best illustrated in FIGS. 6 and 7. A gummer wheel 261 having gummer discs 262 thereon is mounted on shaft 263 for rotation through gears 264 and 265 by the gummer drive shaft 35. As the gummer wheel 261 rotates, the discs 262 pass through glue 266 in glue pot 267 and apply this glue to the paper sheet P in two strips G1 and G2. The paper roll is provided with end plates 268 and 269 having circumferential grooves 271 and 272 therein so that the gummer discs can press firmly against the paper sheet P.

In addition, as the paper sheet P moves with the paper roll it is perforated along the side edge adjacent the glue strips by the perforating device 275. This device comprises a perforating wheel 276 carried by rectangular plunger 277 reciprocally mounted in carriage 278. Spring 279, adjustable in force by screw 280, presses the perforating wheel 276 firmly against the paper sheet. The carriage is clamped by bolt 281 to frame member 5. Thus, as the paper sheet P is moved past the perforating wheel 276, a perforated line 282 is formed adjacent the glue strips G1 and G2.

By the arrangement thus far described, it will be seen that the paper sheet P is fully exposed as it travels with and around the front side of paper roll PR1. This enables the sheet to be printed at this time with any desired indicia. For this purpose the printing roll 285 is provided in tangential relationship to the paper roll PR1, as seen in FIG. 6. The printing roll 285 is driven by drive shaft 37 at a 1:1 ratio with the paper roll and enables any desired indicia to be printed on the paper sheet. If desired, a sheet numbering apparatus (not shown) can be used at this point to number the sheets consecutively.

Thus, by the apparatus thus far described, the paper sheets P have been removed, one by one, from the paper hoppers 100 and have been delivered by the lower and upper paper conveyor belts 109 and 206 to the paper rollers PR1, PR2 and PR3. As the sheets are carried by the paper rollers around the front side thereof, the two glue strips G1 and G2 have been applied thereto and the sheets have been perforated along the lines 282. Also, if desired, the sheets have been printed with appropriate indicia.

The operations at all three units, 1, 2 and 3 have been identical, except that no gumming operation is carried on at unit 3.

*The Carbon Sheet Feeding and Forming Apparatus*

The present machine has a significant advantage mentioned before in that the carbon is brought to the machine in a continuous roll and the carbon sheets are cut from the rolls immediately before the sheets are collated with the paper sheets. The advantage of this is that it eliminates handling of loose sheets of carbon paper which, due to their flimsiness, are extremely difficult to handle by automatic machines.

The carbon supply roll CS1 is mounted for free rotation on brackets 286 fixed to frame member 5, and the carbon web passes upwardly to between the carbon feed roller FR1 and the pressure roller 287 associated therewith. The feed roller FR1 is fixed to drive shaft 85 journaled for rotation in bracket 288 fixed to frame 5. The pressure roller 287 is journaled in frame 289 pivoted to bracket 288 at 290. Spring 291 forces the two rollers together with the pressure therebetween being adjusted by stop screw 292. A manually operable handle 293 permits the operator to swing the two rollers apart so that the carbon web may be inserted therebetween. As has been previously mentioned, the drive shaft 85 can be variably adjusted in speed so that the carbon web can be fed by roller FR1 at a desired rate of sped. The pressure roller 287 is mounted on shaft 294, as seen in FIG. 29, and gears 295 and 296 drive the feed roller FR1 and pressure roller 287 at the same peripheral speed. The pressure roller 287 is provided with a peripheral rubber covering 297 to provide a non-slip grip for the carbon web.

The primary structural member of the carbon sheet forming apparatus is the carriage 300 which is adjustably mounted on frame 5. The carriages 300, like the paper sheet feeding portions of the machine, comprise identical units for each carbon web to be handled, and it is to be understood that the description of one unit thereof will apply to the other sections thereof. As seen in FIGS. 4 and 5, carriage 300 has the power driven shafts 67, 72 and 74 journaled therein.

The carriage 300 carries pinions 301 therein in mesh with racks 303 fixed to frame member 5. Pinion 301 is mounted on shaft 304 having a gear 305 on one end thereof in mesh with worm gear 306 (FIG. 5). The carriage may thus be adjusted on the frame by manual rotation of the handle 307 connected to the worm gear 306, which causes pinion gear 301 to ride back or forth in racks 303 to the desired point. During this movement, the latch 308 (FIG. 27) is held out of engagement with the rack. When the carriage has been moved to the desired position, screw 309 is turned to lock latch 308 into the teeth of rack 303, thus preventing the accidental movement of the carriage relative to the frame of the machine.

The bevel gear 65 is rotatably journaled in bracket 311 of carriage 300 and moves back and forth on drive shaft 64 as the carriage is adjusted in position. The bevel gear 65 carries a key 312 therein which slides in longitudinal groove 313 of shaft 64 so that shaft 64 will impart rotation to bevel gear 65 at all times (FIG. 5).

Returning now to FIG. 23, the carbon web passes from the feed roller FR1 to carriage 300, over the idler roller 315 journaled therein, under the slack roller 316, over the power driven roller 317 mounted on shaft 72, between the knife K1 and anvil 318 to the inclined tray 319, down to and between the carbon roller CR1 and the pressure roller 320 associated therewith.

At this point, it should be brought out that the length of the carbon sheet to be cut by knife K1 will be determined by the selected speed of rotation of the carbon feed roller FR1, as compared to the speed of rotation of the carbon roll CR1. As will be brought out later, the carbon web is fed at a constant linear speed, with the leading edge thereof being always presented to the same point on the circumference of the carbon roll, i.e., the carbon roll CR1 turns through one revolution in the time that the carbon feed roller FR1 advances the carbon web a distance equal to the desired length of a sheet. Since the carbon sheet will always have a length less than the circumference of the carbon roll CR1, it thus becomes obvious that the peripheral speed of the carbon roll CR1 is always greater than the peripheral speed of the carbon feed roll FR1. Since it is not desired to cut the carbon web until after it has been gripped by the carbon roll CR1, it is apparent that there must be a provision made to compensate for the differences in linear rates of movement of the web produced by the feed roller FR1 and the faster moving carbon roll CR1.

This compensation is provided for by means of the slack roller 316 which acts to introduce an amount of slack into the carbon web as it moves through the carriage 300. This will allow the carbon web (fed at a relatively slow constant rate) to be gripped by the faster moving roll CR1 so that the leading portion of the web may travel at the same speed of the roll CR1 and knife K1 at the time the web is sheared, thus allowing the carbon web to be sheared square. The shearing is timed so that it occurs before the slack is completely taken up. The distance between knife K1 and roll CR1 is varied with changes in the selected speed of the carbon feed roller R1 so that the selected length of carbon sheet will be sheared after reaching the proper gripping point on the carbon roll CR1.

The slack roller 316 is freely journaled in lever 321 clamped to shaft 322 journaled in carriage 300. Spring 323 normally biases the slack roller 316 out of engagement with the carbon web. Cam follower 324 (FIG. 8) is also clamped to shaft 322 and is biased by spring 323 and is biased by spring 323 into engagement with slack cam 69 fixed for rotation with shaft 67. Shaft 67 rotates at the same rate as does the carbon roll drive shaft 28, and thus slack cam 69 completes a full revolution in the same time as does the carbon roll CR1. As the slack cam 69 rotates, the slack roller is steadily pressed downwardly between the idler roller 315 and power driven roller 317 to form a loop in the carbon web. The step 325 of the slack cam abruptly releases the slack roller 316 for upper return thereof by spring 323 at the same time that the carbon roll CR1 grips the leading edge of the carbon web. The slack loop formed by the release of the slack roller allows the carbon roll CR1 to pull the web freely until the slack is taken up. Obviously, if the web were not severed at this time, the web would be torn, since it is firmly held by the carbon feed roll FR1 and the pressure roller 287. However, before the slack is fully taken up, the knife K1 severs the web.

The knife K1 is clamped for rotation with drive shaft 74 and includes a hardened cutting edge member 326 adapted to engage the hardened cutter member 327 of the anvil 318 to shear the carbon web. This shearing is, of course, related to the operation of the carbon roll CR1 and is timed so that the carbon web is sheared immediately after the carbon roll has gripped the leading edge of the carbon web. The required synchronization could be achieved by making the radius of the knife edge the same as the radius of the carbon roll and by rotating each at the same speed. However, it is desirable that the radius of the knife edge be smaller and in the present embodiment this radius is one half that of the carbon roll CR1. In order that the knife edge have the same peripheral speed as that of the carbon web (when gripped by the carbon roll), the knife drive shaft is driven at a speed twice that of the carbon roll CR1. As a consequence, the knife will complete two revolutions in the time that the carbon roll completes one revolution, which thus requires that the cutting of the web occur on every other revolution of the knife. This is accomplished in the present embodiment by moving the anvil 318 out of the way of knife K1 on every other revolution of the knife and into the path of the knife edge on every other revolution thereof.

The cutter 327 of the anvil 318 is secured to cutter holder 328, and the holder in turn is mounted on body member 329 by a plurality of adjusting screws 330. As seen in FIG. 25, alternate of the screws 330 are threaded into the holder 328 with the other screws being threaded into the body member 329. By suitable adjustment of the screws, the cutter 327 can be adjusted for any irregularities in the cutting edge of the knife K1.

The body member is secured by bolts 331 to brackets 332 pivoted to the carriage as at 333. Springs 334 confined between the body 329 and the heads of bolts 331 allow some give to the anvil as the knife member strikes the anvil. The brackets extend rearwardly and carry cam followers 335 thereon which are adapted to engage cam 68 rotated by drive shaft 67. Springs 336 bias the bracket 332 upwardly into engagement with the adjustable stop members 337 threaded in carriage 300.

Cam 68 rotates at a rate one half that of the knife K1 and consequently rotates at a rate equal to that of the carbon roll CR1. As is seen in FIGS. 30 and 31, cam 68 is designed so that for one half of its revolution, bracket 332 is forced downwardly to move the anvil out of the way of the cutting edge of knife K1 as it completes one revolution. This is the position illustrated in FIG. 30. On the other half of the revolution of cam 68, bracket 332 is free to move up against the stop member 337. The cutting edge 326 of the knife K1 will now shear against the cutter 327 of anvil 318 to sever the carbon web C.

Although the cutting edge 326 of knife K1 and cutter 327 of anvil 318 have been illustrated as at right angles to the carbon web, so that the entire width of the carbon web is cut at the same instant, it is to be realized that the cutting edge 326 could be made slightly helical in shape so that the cut across the carbon web would start at one side and progress towards the other. This latter arrangement will provide an easier cut while yet resulting in a cut at right angles to the carbon web.

After the carbon web passes through the carriage 300 it slides down the inclined tray 319 to the carbon roll CR1. The tray comprises upper and lower sections 341 and 342 telescopically arranged for longitudinal sliding movement. The upper section is secured to bar 343 mounted by brackets 344 to carriage 300, and the lower tray section 342 is secured to bar 345 mounted on brackets 346 to frame member 5 and also connected by bolt 347 to frame 5. Thus, regardless of the position of carriage 300 on frame 5 to which it is adjusted, the tray 319 will extend from the carriage to adjacent the carbon roller CR1.

An upstanding triangular rib 348 extends from the carriage 300 down the length of the tray, being secured thereto by frictional engagement of the turned under fingers 349 of the rib member. The rib 348 acts to provide a break in the carbon web C, as shown in FIG. 24, to give longitudinal stability to the web as it feeds downwardly from the carriage 300 to the carbon roll CR1.

The carbon roll CR1 is identical in construction to the paper roll PR1, as best seen in FIGS. 6 and 7, except that the end plates 268 and 269 of the paper roll are not provided for the carbon roll. Again, the carbon roll has a plurality of ports 350 longitudinally of the periphery thereof which ports fluidly communicate through manifold 351 and passages 352 with the interior of drive shaft 28. O-rings 353 seal the carbon roll to the shaft 28 to prevent leakage of air.

The rotary slide valve 30 on shaft 28 is connected by hose 354 to a source of vacuum (not illustrated) and serves to supply vacuum to the pickup ports 350 of the carbon roll when the carbon roll reaches the position shown in FIG. 6.

In the over-all operation of the carbon sheet feeding and forming apparatus, the continuous carbon web is threaded through the carbon feed roller FR1 and the pressure roller 287 associated therewith, and the carbon web is fed therefrom at a constant rate depending upon the setting of the variable drive mechanism 79. The carbon web advances through carriage 300 as above described. Assuming that the web has just been severed by knife K1, the leading edge of the web will move down tray 319 until it reaches the carbon roll CR1. As it so moves, the slack roller 316 has gradually formed a loop between the idler roller 315 and power driven roller 317. The leading edge of the carbon web reaches the carbon roll CR1 just as the pick-up ports 350 thereof come to the position illustrated in FIGS. 6 and 23. The vacuum applied to these ports sucks the carbon web against the carbon roll and moves the carbon web between the carbon roll CR1 and the pressure roller 320 associated therewith.

The slack cam allows the slack roller 316 to move quickly out of the way and enables the leading edge of the carbon web to be moved at a faster linear speed than does the rear of the carbon web. The knife K1 completes its second revolution and strikes against anvil 318 to shear the carbon web thereby forming a sheet thereof.

It will be noted that the carbon web is always gripped by the feed roller FR1 and that the web is gripped by the carbon roll CR1 before the web is severed by knife K1. Thus, the carbon sheet is under control at all times during the operations of the machine.

As has been mentioned, the carriage 300 may be moved towards or away from the carbon roll in order to vary the length of the carbon sheet. After doing so, the variable speed drive 79 must be adjusted so that a full sheet length of the carbon sheet will be fed by the feed roller FR1 once for every complete revolution of the carbon roll CR1.

By the operation of the machine elements thus far described, the paper and carbon rolls PR1 and CR1 each have a sheet of paper and carbon gripped respectively thereby, and as described above, the paper sheet has two strips of glue G1 and G2 applied thereto.

As the paper and carbon roll rotate, the carbon sheet C will be carried under the glue pressure roller 360. This roller is journaled on frame 5 and rides against the end plate 268 of paper roll PR1, to press the edge of carbon sheet C firmly against the glue strip G1 on paper sheet P. As seen in FIG. 6, the glue strip G2 on the paper sheet is not covered by the carbon sheet but instead remains exposed.

The glued-together paper and carbon sheet are ejected from the paper and carbon rolls as illustrated in FIG. 6. A plurality of strippers 361, mounted on frame 5, ride in the grooves 362 of the resilient covering 235 of the paper roll to strip the sheets from the paper roll. Similarly, a plurality of strippers 363 rides in grooves 364 of the resilient covering 365 of the carbon roll to strip the sheets from the carbon roll.

The sheets move between the strippers 361 and 363 and are picked up by the power driven roller 366 and idler roller 367 for ejection into the stationary tray T1. The roller 366 is driven by drive shaft 33 at a peripheral speed equal to the linear speed of the paper and carbon sheets.

In order to insure that the paper and carbon sheets are ejected by the rollers properly into tray T1, roller 370 (FIG. 6) is pressed downwardly against the sheets on each cycle of the machine. Roller 370 is mounted on bell crank lever 371 which is pivoted to frame 5 at 372 and is biased in a clockwise direction by spring 373. Link 374 is pivotally connected to lever 371 at 375 and to lever 376 at 377. Lever 377 carries cam roller 378 thereon pressed by spring 373 into engagement with cam 379 mounted on the carbon roll drive shaft 28 (FIG. 3). As drive shaft 28 rotates, the oscillation of lever 376 will be transmitted by link 374 to produce an oscillation of bell crank lever 371 to move roller 370 up and down.

After ejection of the glued-together paper and carbon sheets from rollers 366 and 367, they come to rest upon the rails 380 of tray T1 with the leading edge of the sheets abutting against the stop member 381 of the tray (FIG. 16). One side of the sheets will rest against the vertical guide 382 and the glued side of the sheets will rest in one of the four channels of the swastika-shaped guide 383, against the face 384 thereof opposed to the tray guide 382.

In the operation of the machine thus far described, the three units will have operated simultaneously such that units 1 and 2 will each have delivered glued-together sheets of paper and carbon to trays T1 and T2 and unit 3 will have delivered an unglued sheet of paper to tray T3.

*Transfer From Trays to Conveyor*

The next function of the machine is to transfer the sheets from trays T1, T2 and T3 to the conveyor generally indicated by the reference numeral 400.

In general, the conveyor has a plurality of sheet holders integral therewith and spaced apart in accordance with the spacing between the trays. When the conveyor is properly positioned relative to the trays, vacuum operated devices grip the sheets in the trays and move them down simultaneously to the sheet holders. In the next cycle of operation, the conveyors move forwardly so that the sheet holders are positioned relative to the next tray and the new sheets in the trays are again moved down onto the conveyor. This process is continually repeated with a glued together paper and carbon sheet delivered from tray T1 to an empty sheet holder of the conveyor, with a glued together paper and carbon sheet delivered from tray T2 to a sheet holder having a glued together paper and carbon sheet thereon, and with a single paper sheet delivered from tray T3 to conveyor 400 and placed upon two sets of glued together paper and carbon sheets. The completed packets are then ejected from the machine to a carry-away conveyor.

Turning now to the specific details of the above mechanisms, and particularly to FIG. 33, the conveyor comprises a plurality of interconnected links 401 trained around the sprocket teeth 402 of the conveyor drive sprockets 43 and 44 at the delivery end of the upper flight and the conveyor idler sprockets 403 at the other end of the conveyor. The idler sprockets are fixed to shaft 404 freely journaled in frame 5.

At spaced intervals along the conveyor, sheet holding bars 405 are secured to links 401. The bars 405 have an upstanding stop 406 extending across the conveyor and a plurality of pins 407 projecting upwardly from the upper surface of the bars 405. A plurality of flat upper surfaced bars 408 are mounted across the conveyor on links 401 to the rear of bar 405, relative to the direction of movement of the upper flight of the conveyor. A plurality of flat leaves 409 are rigidly secured to one of the bars 408 and extend forwardly therefrom. As seen in FIG. 33, the leaves 409 lie flat upon the forward bars 408 when the surfaces thereof are parallel, but will separate therefrom as the conveyor passes around one of the conveyor sprockets.

The sheets resting in trays T1, T2 and T3 are transferred therefrom to conveyor 400 by cooperation of the incremental rotation of the swastika-shaped guide 383, the transfer tube 415, the braker bar 416 and the presser feet 417. In this transfer operation, the glued sides of the sheets are gripped and moved downwardly to the sheet holders 405 on the conveyor 400.

The swastika-shaped guide 383 comprises a plurality of angle irons 418 bolted together by screws 419 in a configuration as illustrated in FIG. 33. As has been mentioned previously, the sheets rest in one of the channels of guide 383 with the glued side edge of the sheets flush against the vertical face 384 of the guide and supported by the horizontal face 420 of the guide. In transferring the sheets from the guide, the guide is caused to rotate 90° in a clockwise direction (as seen in FIG. 33) so that the side edges of the sheets are unsupported by the face 420 and are free to move downwardly.

The guide 383 has shafts 421 secured at either end thereof (FIG. 21) which shafts are freely journaled in bearing 422 fixed to frame 5. A plate 423, keyed by key 424 to shaft 421, has four rollers 425 thereon spaced 90° apart. A friction plate 426 is interposed between bearing 422 and plate 423 and is held against rotation relative to bearing 422 by bolts 427. Springs 428 force the friction place into frictional engagement with the plate 423.

The guide 383 is rotated through 90° by means of pawl 429 pivotally mounted at 431 to bracket 432 fixed to index bar 433. This bar is mounted in frame 5 for reciprocatory movement and is urged to the left (FIG. 22) by spring 434. A roller 435 carried on index bar 433 engages one end of lever 436 which is pivoted to frame 5 and carries a cam follower roller 437 thereon in engagement with index cam 45 mounted on camshaft 42. Cam 45 rotates through 360° in one cycle of operation of the machine.

As cam 42 rotates, the cam flat 438 thereon allows lever 436 to pivot to the dotted line position, allowing spring 434 to move the index bar to the left. The face 439 of pawl 429 pushes against the roller 425 adjacent thereto and moves the plate 423 through 90°. On the return stroke of the index bar, the inclined face 440 of the pawl rides up over the next roller 425 so that the pawl may return to the position illustrated in FIG. 22. Since plate 423 is keyed to shaft 421, the swastika-shaped guide 383 will similarly rotate through 90°. The friction plate 426 will prevent the guide 383 from rotating backwardly on the return stroke of the index bar 433.

The transfer tube mechanism 415 comprises a hollow tube 442 having a plurality of longitudinally disposed gripping ports 443 arranged to engage the lower surface of the sheets disposed in the trays T1, T2 and T3 adjacent the glued edges of the sheets. The transfer tubes are connected by hoses 444 to slide valve 445 and by hoses 446 therefrom to manifold 447 which is connected to a source of vacuum (not shown). The slide valve 445 is operated to apply vacuum at an appropriate time in the cycle of operation of the machine to grip the sheets to move them from the trays.

The transfer tube 442 is mounted at either end on arms 448 pivoted to frame 5 at 449. A link 450 is pivotally mounted at one end thereof to arm 448 at 451 and at its other end to the transfer tube bar 452. The transfer tube bar is mounted in frame 5 for reciprocatoiry longitudinal movement, and is biased to the left (FIG. 32) by spring 453.

The transfer tube bar carries thereon cam follower 454 (FIG. 40) pressed into engagement with cam 50 by spring 453. Cam 50 is mounted on camshaft 49 and rotates through 360° in one cycle of operation of the machine. As cam 50 rotates, it imparts a reciprocatory motion to transfer tube bar 452, which in turn through link 450 imparts a rocking movement to arms 448 to move the transfer tube 442 between the solid and broken line positions depicted in FIG. 33.

The slide valve 445 illustrated in FIGS. 36, 37 and 38, comprises a valve body 456 secured by bolts 457 to frame member 5. Passage 458, through the valve body, connects with hose 446. A slide member 459 slides on top of valve body 456 and has a port 460 therethrough adapted to be moved into and out of registration with passage 458. A separator plate 461, having a port 462 in alignment with passage 458, is disposed on top of slide member 459 and beneath the second slide member 463. A top body member 464 has a passage 465 therethrough connected to hose 444. Springs 466 press the valve parts together.

The top slide member 463 has a port 467 therethrough adapted to be moved into and out of registration with passage 465, and is connected to rod 468. This rod extends to the handle 469 at the front of the machine (FIG. 8) and enables an operator to manually shut off valve 445 at any time it is so desired. Manual movement of the slide 463 to the left (FIG. 37) moves port 467 out of registration with passage 465 and thus prevents the transfer tube from being conected to the source of vacuum.

The slide member 459 is connected by bolts 470 to one end of the slide bar 471 mounted for reciprocation in frame 5, and biased to the right (FIG. 36) by spring 472. The other end of slide bar 471 is connected by link 473 to lever 474 pivotally connected at 475 to frame 5 and having a cam roller 476 engaged with cam 52 mounted on camshaft 49. Rotation of cam 52 causes a reciprocatory movement of slide bar 471 to move the port 460 of the valve slide member 459 into and out of registration with the passage 458 of the slide valve.

Figure 13:
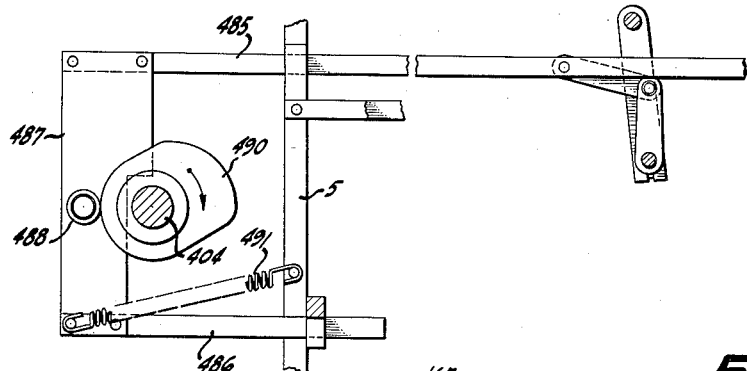
FIG. 13 is a sectional detail view, taken on line 13—13 of FIG. 8, illustrating the cam operation of the breaker bar operator.

The breaker bar 416 is disposed above and extends across the conveyor and is mounted at its ends to cranks 481 secured to shaft 482. Also fixed to shaft 482 is crank 483 connected by link 484 to the breaker bar slide bar 485. The slide bar 485 is mounted in frame 5 for reciprocatory movement. As seen in FIG. 13, the slide bar 485 and the guide bar 486 (also reciprocally slidable in frame 13) are interconnected by plate 487 having a cam follower roller 488 thereon held in engagement with cam 490 by spring 491. The cam 490 is mounted on idler sprocket shaft 404 and rotates therewith to produce a reciprocatory movement of slide bar 485. This movement is transmited through link 484 and cranks 483 and 481 to the breaker bar 416 to move this bar between the full and broken line positions of FIG. 32.

The presser feet 417 are mounted in pairs on shaft 492 journaled in frame 5. Each pair of presser feet 417 is designed to cooperate with one of the pins 407 on the conveyor sheet holding bars 405 to press the sheets onto the pins 407.

Pinion 493, on shaft 492, is in mesh with rack 494 secured by member 495 to slide bar 496. The slide bar is mounted in frame 5 for reciprocatory movement, and is biased to the right (FIG. 39) by spring 497. Slide bar 496 carries thereon roller 498 in engagement with lever 499, which is pivotally connected at 501 to frame 5. Cam follower roller 502 on lever 499 is held in engagement with cam 51 by spring 497. As cam 51 rotates with camshaft 49, the slide bar 496 and rack 494 will reciprocate, causing the presser feet 417 to oscillate between the full and dotted line positions of FIG. 39.

The above described mechanisms operate in the following sequence during a cycle of operation of the machine. The beginning of the cycle may be considered as the time that sheets of carbon and/or paper are at rest in the trays T1, T2 and T3. The position of the swastika-shaped guide 483, the transfer tube 415, the breaker bar 416 and the presser feet 417 at this time are all indicated in full lines in FIG. 33.

The slide valve 445 is operated to apply vacuum to the gripping ports 443 of the transfer tube, causing the sheets to adhere thereto. The swastika-shaped guide 383 rotates in a clockwise direction (FIG. 33) in order to free the sheets for downward movement by the transfer tube 415 which then rotates in a counterclockwise direction (FIGS. 32 and 33) carrying the glued edge of the sheets down toward the conveyor. This last movement is timed to the travel of the conveyor so that the edge of the sheet lands against the stop 406 of the conveyor sheet holding bar 405. There is a slight amount of overtravel of the sheets by the transfer tube to insure that the sheet edges will be flush against the stop 406, and this overtravel causes the sheets to buckle slightly upwardly. The breaker bar which has been rotating clockwise comes into contact with the sheets, breaking the upward buckle thereof and causing the sheets to buckle downwardly therearound. The presser feet, which have also been rotating in a clockwise direction, press the sheets downwardly onto the pins 407 of the sheet holders 405. Simultaneously with this last operation, the valve 445 closes to release the sheets from gripped engagement by the transfer tube. The sheets will now be firmly gripped by the conveyor and will be pulled from the trays by forward movement of the conveyor. The transfer tube, breaker bar and presser feet then return to their original positions during the remainder of the cycle.

During the above described cycle, it will be understood that new sheets are delivered to the trays T1, T2 and T3, so that the cycle may be immediately repeated.

After the paper sheet from tray T3 has been transferred to the conveyor, the sheet holders 405 thereof will have two sets of glued together paper and carbon sheets and a third paper sheet stacked on top of one another. The glue strips G2 of the bottom two of the paper sheets will be in contact with the underside of the paper sheets superimposed thereon.

The conveyor then moves these sets of sheets under and past the pressure bar roller 505 (FIG. 34) which is secured by bolts 506 on shaft 49 for rotation thereby. The pressure bar roller 505 and conveyor sprockets 43 and 44 have the same diameter and are driven at the same rate. It should be noted that the sheet holders 405 on conveyor 400 are spaced apart a distance equal to the periphery of conveyor sprockets 43 and 44.

The pressure bar roller 505 has a resilient pressure bar 507 mounted longitudinally thereon. The rotation of the pressure roller is synchronized with the conveyor travel so that the pressure bar 507 comes into contact with the paper and carbon sheets and presses against the glue strips 62 of the paper sheets, to press the sheets together firmly.

As the conveyor continues to travel forwardly, the peripherally disposed pressure pads 508 on the pressure bar roller maintain a firm pressure on the sheets as they are discharged from the conveyor.

As the sheet holder bar 405 starts around the sprockets 43 and 44, the pins 407 are retracted by mechanism to be hereinafter described. The forward free ends of the leaves 409 separate from the forward bars of the conveyor and direct the sheets towards nipper rollers 510 and 511. These rollers are rotated by a suitable power source (not shown) in the directions shown in FIG. 34. The roller 510 has a plurality of peripheral grooves 512 formed therein to allow the conveyor leaves to pass therethrough, and roller 511 has a suitable resilient gripping cover 513. The gripper rollers pass the collated paper and carbon sheets onto conveyor belt 515 (powered by conventional means not shown) to convey the sheets to any desired point of use.

The mechanism referred to above for retracting the pins 407 is best illustrated in FIGS. 41–44. The pins 407 are secured to carrier bar 520 disposed beneath the sheet holder bar 405 and project upwardly through holes 521 in the sheet holder bar. The carrier bar is loosely mounted for vertical movement on bolts 522 and is spring-pressed upwardly by springs 523. Two generally T-shaped spreader members are provided with the head portions 524 thereof confined between the carrier bar and sheet holder bar and with the shank portions 526 thereof held to the sheet holder bar by brackets 527 secured thereto by bolts 528. Screws 529 in the sheet holder bar project loosely into holes 530 in the head portions 525 to prevent lateral shifting thereof relative to the sheet holder bar. A depending stub 531 on each spreader member carries a cam follower roller 532 on the lower end thereof.

Cam members 535 are mounted on frame 5 in the path of movement of the cam follower rollers 532, and, as best seen in FIGS. 42 and 43, when the cam rollers move against the cam faces 536, the rollers 532 will be forced away from the center line of the conveyor. This movement tilts the head portion 524 of the spreader members and moves the carrier bar downwardly, as illustrated in the dotted line position of FIG. 43. This downward movement causes the pins 407 to retract into the holes 521, freeing the sheets held thereby so that they may be fed to the nipper rollers 510 and 511 and to the conveyor 515.

*The Adjustability of the Machine*

As has been previously described, the machine can be easily adjusted to form and handle different lengths of carbon sheets by moving the carriage 300 towards and away from the carbon rolls CR1 and CR2. In addition, the machine can easily handle different widths of the carbon sheets, with the maximum width being determined by the length of the carbon rolls CR1 and CR2 and the paper rolls PR1 and PR2. However, regardless of the width of the carbon sheets to be handled, it is essential that one edge thereof is always positioned to be fed to the carbon rolls such that the edge of the sheet will be glued to the glue strip G1 on the paper sheet. That is, as viewed in FIG. 7, the right edge of the carbon sheet must always pass under the glue pressure roller 360. The left edge of the carbon sheet will then be spaced from the glue pressure roller 360 at a distance therefrom corresponding to the width of the carbon sheet, with the width being anywhere up to the full length of the carbon roll. It is desirable that the rig 348 (FIG. 24) be under the center line of the carbon sheets, and this rib may be easily moved to the right or left as desired since it is secured to tray 319 only by the frictional engagement of the turned under fingers 349 thereof.

Similarly, the paper sheets may be of any width or length desired, within the limits of the paper rolls. Since the paper sheets are handled only by the leading edges thereof as they are fed from the paper sheet hoppers 100 to conveyors 109 and as they are fed from the conveyors 206 to the paper rolls PR1, PR2 and PR3, it is obvious that no adjustment of the machine need be made to handle different lengths of paper sheets. The maximum length of the sheets is, of course, limited by the circumference of the paper rolls and should be no greater than the peripheral length of the pad 235 thereon.

Again in regards to FIG. 7, it is essential to the operation of the machine that the right edge of the paper sheets be fed to the paper rolls such that this edge is always positioned relative to the paper rolls so that glue strips G1 and G2 are applied along that edge. However, the width of the paper sheets can be any desired dimension, up to the limit imposed by the longitudinal length of the paper rolls.

In order to prevent the paper sheets from being skewed as they are transferred from the hoppers 100 to the paper rolls PR1, PR2 and PR3, the two lower paper conveyors 109 are symmetrically disposed to the lengthwise center line of the paper sheets, and the single upper paper conveyor 206 is disposed on this center line of the sheets. Accordingly, when it is desired to use the machine on a different width paper sheet, it is necessary to shift the conveyors 109 and 206 longitudinally of the machine to be aligned with the vertical center line of the sheets.

A shaft 550 (FIG. 8) is journaled in frame 5 and is provided with a manually rotatable handle 551. Shaft 550 has fixed thereon pinions 552, 553 and 554 in mesh with racks 555, 556 and 557, respectively. Link chain 559 (FIG. 32), trained around sprockets 558 and 560, on shafts 550 and 561, respectively, drives shaft 561 upon rotation of shaft 550. Shaft 561 has pinions 562 and 563 thereon in mesh with racks 564 and 565, respectively (FIG. 16). Thus, manual rotation of handle 551 produces longitudinal movement of racks 555, 556, 557, 564 and 565.

Rod 566 (FIG. 8) extending from front to back of the machine has vertical struts 567 and 568 fastened thereto. The struts in turn are rigidly secured to the horizontal carriage bars 569, 570, 571 and 572 which extend from one end of the machine to the other. The carriage bars are mounted in frame 5 for reciprocatory movement, and bars 570 and 572 have the racks 555 and 556 secured respectively thereto. Rod 566 is secured at its rear end to bracket 573 in which drive shafts 54 and 59 are journaled. Movement of rod 566 and bracket 573 to the right or left (FIG. 32) produces a corresponding axial movement of drive shafts 54 and 59. Thus, rotation of the manually operable handle 551 produces longitudinal movement of the carriage bars 569, 570, 571 and 572 and of the drive shafts 54 and 59, all in unison.

Carriage bars 575, 576, 577 and 578 (FIG. 16) are similarly rigidly interconnected for longitudinal reciprocation by racks 564 and 565, these racks being formed integrally with carriage bars 576 and 578, to reciprocate in unison with the elements described in the last paragraph.

The adjustments created by rotation of the manually operable handle 551 are best illustrated in FIG. 16.

The lower paper conveyor support rails 202 are rigidly connected to carriage bars 570 and 572 by the brackets 581 and 582 depending from the support rails. Idler pulley 209 is mounted in bracket 583 also secured to carriage bar 570. Thus, movement of carriage bars 570 and 572 adjusts the position of rails 202 and idler pulley 209 relative to the centerline of the paper sheets. The support rails 203 (FIG. 32) are loosely disposed upon carriage bars 570 and 572 in a similar manner as are the rails 202, and can be shifted manually thereon.

The spring pressed rollers 108 and 205 associated with the lower conveyor belts 109 are pivoted to member 584 fixed in turn to carriage bars 569 and 571. Thus, longitudinal movement of carriage bars 569 and 571 will shift these rollers 108 and 205 relative to the centerline of the paper sheets.

Longitudinal movement of drive shaft 54 will produce shifting of the lower conveyor drive rollers 201 and will move the delivery ends of conveyor belts 109 relative to the centerline of the paper sheets. Idler pulley 210 will also be shifted by drive shaft 54.

Longitudinal movement of drive shaft 59 will shift the position of the upper conveyor belt drive wheel 207 to shift the conveyor belt 206 thereon relative to the centerline of the paper sheets.

The support rail 213 for conveyor belt 206 is mounted by depending bracket 586 and 587 securely to carriage bars 576 and 578. Idler roller 219 is mounted in bracket 588 which is secured to carriage bar 576, and idler rollers 221 and 222 are mounted in bracket 587. Longitudinal movement of the carriage bars 576 and 578 thus adjusts the position of support rail 213, and idler rollers 219, 221 and 222 relative to the center line of the paper sheets. The other support rails 214 are mounted loosely on the carriage bars 576 and 578 and may be manually positioned as desired.

The idler pulleys 211 and 212 and the spring-pressed rollers 205 associated with the upper conveyor belt 206 are carried by members 589 secured to carriage bars 575 and 577 so that longitudinal movement of these carriage bars will shift the above pulleys and rollers together with the conveyor belt 206.

Returning to FIG. 8, the remaining pinion 554 on shaft 550 engages rack 557 secured to the vertically disposed tie rod 591. Carriage bars 592 and 593 are rigidly connected to tie rod 591 and are mounted in frame 5 for reciprocatory movement therein. Bracket 594 is also rigidly connected to tie rod 591 and serves as the end journals for the shafts 212 and 153 of the pickup and transfer mechanisms 105 and 106.

Rotation of the manually operable handle 551, by the above described elements, will produce a longitudinal movement of the carriage bars 592 and 593 and will produce a movement of bracket 594 into and out of the plane of the drawing of FIG. 8. This movement of bracket 594 will shift the position of the pickup and transfer mechanisms 105 and 106 so that they will always be positioned between the conveyor belts 109.

As best seen in FIG. 16, the lower conveyor idler rollers 107 are mounted on brackets 595 secured to carriage bar 592, and will thus move therewith.

Thus, whenever it is desired to use the machine for a particular width paper, the manually operable handle 551 is rotated to simultaneously move the upper and lower conveyors 206 and 109 and the pickup and transfer mechanisms 105 and 106 into alignment with the center line of the paper sheets.

As has been described, the right-hand edges of the paper and carbon sheets (as viewed from the front of the machine) always pass through the carbon and paper rolls at the same point, and thus will always be projected into the trays T1, T2 and T3 so that this right-hand side of the sheets will rest in the swastika-shaped guides 383, and the forward edge of the sheets will come to rest against the tray stop 381. The only adjustment that needs to be made is to move the tray guides 382 which engage the left-hand edges of the sheets in the trays (FIG. 32). These guides merely rest upon frame bars 596 and may be moved manually thereon to a desired position spaced from the swastika-shaped guide 383 a distance equal to the width of the sheets.

No adjustment need be made of the conveyor 400 since the edge of the sheets in the trays will always be disposed in the swastika-shaped guides 383 when it is time to transfer the sheets from the trays to the conveyors.

*Gummer Adjustment*

The gummer wheel 261 rotates about an axis fixed in relation to the paper roll PR1, and consequently the gummer discs 262 will apply the glue strips G1 and G2 uninterruptedly along the entire length of the paper sheet P passing therepast in the normal operation of the machine.

There may be occasions, however, when it is desired to interrupt the glue strips at one or more intervals so that desired portions of the paper sheet will not have glue applied thereto. This operation is performed on the present machine by pressing a wiper plate against the gummer discs, one or more times during a cycle of operation. The wiper plate will wipe the glue from the gummer discs and will thus prevent the application of the glue to the paper sheet. When the wiper plate is removed from the gummer discs, the gluing will recommence.

Referring now to FIG. 6, the glue pot 267 is provided with ears 601 on the front end thereof pivoted on shaft 602 supported by brackets 603 on frame 5. The brackets 603 are adjustable in height by screw 604. The rear end of glue pot 267 has a spring plate 605 secured thereto resting upon adjustment screw 606 mounted in crank 607. Spring 608 maintains the adjustment screw 606 in adjusted position. The glue pot is also provided with a generally vertical wiper plate 609 adapted to wipe against the gummer discs 262 when the rear end of the glue pot is elevated.

The crank 607 is secured to shaft 610 journaled in bracket 611. The shaft 610 also has crank 612 (FIG. 8) secured thereto. Crank 612 is biased by spring 613 in a counterclockwise direction, forcing cam follower roller 614 on crank 612 into engagement with the adjustable cam wheel 615. The cam wheel 615 is secured to the paper roll drive shaft 23 for rotation thereby, and is provided with a plurality of holes 616 around the periphery thereof. Any desired number of cam elements 617 may be secured in the holes 616, and, when so disposed, will present cam surfaces 618 to the cam follower roller 614.

As the cam wheel 615 rotates, the cam faces 618 of elements 617 will force the crank 612 in a clockwise direction, causing crank 607 to also rotate clockwise, rocking the glue pot 267 in a clockwise direction about shaft 602. This movement brings the wiper plate 609 against the gummer discs 262 to wipe the glue therefrom in order that no glue will be deposited on the paper sheet. As the cam element 617 rotates past the cam follower roller 614, the elements will return to their original positions again allowing the gummer discs 262 to deposit the glue strips G1 and G2 on the paper sheet.

It is apparent from the above detailed description that the described machine is capable of forming collated packets of paper and carbon sheets in which the packets may be widely varied as to length and width. Also, the present machine is capable of forming the carbon sheets from continuous rolls of carbon webbing, thereby eliminating the difficulties normally encountered in handling pre-cut carbon sheets.

It is to be understood that the form of the invention herewith shown and described is to be taken as a preferred embodiment of the same, and that various changes may be made in the shape, size and arrangement of parts without departing from the spirit of the invention or the scope of the attached claims.

Having thus described my invention, what I claim and desire to secure by Letters Patent is:

1. The method of collating carbon and paper sheets comprising feeding a continuous carbon web by a feed roller to a pair of rollers spaced therefrom, rotating said pair of rollers at a higher peripheral speed than said feed roller, gripping the leading edge of said carbon web by one of said pair of rollers at a predetermined point thereon, forming a slack loop in said carbon web between said feed roll and said one roller as said carbon web is gripped by said one roller, severing said carbon web after said carbon web is gripped by said one roller and before said slack loop is taken up to form a carbon sheet gripped by said one roller, feeding a paper sheet to the other of said pair of rollers, bringing said sheets into contact with one another between said pair of rollers, and attaching said sheets together as they pass between said pair of rollers.

2. The method of collating carbon and paper sheets comprising feeding a continuous carbon web by a feed roller to a pair of rollers spaced therefrom, rotating said pair of rollers at a higher peripheral speed than said feed roller, gripping the leading edge of said carbon web by said pair of rollers, forming a slack loop in said carbon web between said feed roll and said pair of rollers as said carbon web is gripped by said pair of rollers, severing said carbon web after said carbon web is gripped by said pair of rollers and before said slack loop is taken up to form a carbon sheet gripped by said pair of rollers, feeding a paper sheet to said pair of rollers, bringing said sheets into contact with one another between said pair of rollers, and attaching said sheets together as they pass between said pair of rollers.

3. The method of collating carbon and paper sheets comprising feeding a continuous carbon web by a feed roller to a pair of rollers spaced therefrom, rotating said pair of rollers at a higher peripheral speed than said feed roller, gripping the leading edge of said carbon web by one of said pair of rollers, forming a slack loop in said carbon web between said feed roll and said one roller as said carbon web is gripped by said one roller, severing said carbon web after said carbon web is gripped by said one roller and before said slack loop is taken up to form a carbon sheet gripped by said one roller, feeding a paper sheet to the other of said pair of rollers, gripping the leading edge of said paper sheet by said other roller, applying a glue strip along one edge of one of said sheets, bringing said sheets into contact with one another between said pair of rollers to glue said sheets together along the side edges thereof, and ejecting the glued-together sheets from said pair of rollers.

4. The method of collating carbon and paper sheets comprising feeding a continuous carbon web by a feed roller to a pair of rollers spaced therefrom, rotating said pair of rollers at a higher peripheral speed than said feed roller, gripping the leading edge of said carbon web by one of said pair of rollers at a predetermined point thereon, forming a slack loop in said carbon web between said feed roll and said one roller as said carbon web is gripped by said one roller, severing said carbon web transverse to its length between said slack loop and said one roller after said carbon web is gripped by said one roller and before said slack loop is taken up to form a carbon sheet gripped by said one roller, feeding a paper sheet to the other of said pair of rollers, gripping the leading edge of said paper sheet by said other roller at a predetermined point thereon, applying a glue strip along one edge of one of said sheets, bringing said sheets into contact with one another between said pair of rollers to glue said sheets together along the side edges thereof, releasing said sheets from said pair of rollers, and ejecting the glued-together sheets from said pair of rollers.

5. A collating machine comprising a plurality of units; each unit comprising a pair of rotatable rollers in tangential contact with one another, each of the rollers including gripping means, a paper sheet feeding means for feeding paper sheets one-by-one to one of said rollers to be gripped by the gripping means thereof, carbon feeding means for feeding a continuous carbon web to said other roller to be gripped by the gripping means thereof, carbon sheet forming means to sever said carbon web to form a carbon sheet when said carbon web is gripped by said other roller, means to attach said carbon sheet and paper sheet together as said sheets pass between said rollers, and a tray disposed adjacent said pair of rollers to receive said sheets from said rollers after they pass therebetween; a movable endless conveyor having its upper flight disposed for travel adjacent the tray of each unit, a plurality of sheet holders mounted on said endless conveyor and spaced apart thereon in correspondence to the spacing between said trays, transfer means for simultaneously transferring the sheets from all of said trays to said endless conveyor sheet holders with the sheets from each tray being transferred to different sheet holders, means associated with said conveyor for attaching said sheets together after the upper flight of said conveyor has passed the last of said trays, and ejecting means for removing said sheets from said endless conveyor after said sheets have been attached together.

6. A collating machine comprising a pair of rotatable rollers in tangential contact with one another, each of the rollers including gripping means, a paper sheet feeding means for feeding paper sheets one-by-one to one of said rollers to be gripped by the gripping means thereof, carbon feeding means for feeding a continuous carbon web to said other roller to be gripped by the gripping means thereof, carbon forming means to sever said carbon web to form a carbon sheet when said carbon web is gripped by said other roller, means to attach said carbon sheet and paper sheet together as said sheets pass between said rollers, and a tray disposed adjacent said pair of rollers to receive said sheets from said rollers after they pass therebetween, an endless conveyor having its upper flight disposed for travel adjacent said tray, a plurality of spaced apart sheet holders mounted on said endless conveyor, transfer means for transferring the sheets from said tray to said endless conveyor sheet holders, a power drive means, means transmitting the drive of said drive means to said pair of rollers to rotate said rollers simultaneously, and means simultaneously transmitting the drive of said drive means to operate said paper sheet feeding means, said carbon feeding and forming means, said endless conveyor and said transfer means to feed one paper sheet to said pair of rollers, to form and feed one carbon sheet to said pair of rollers, to move the upper flight of said endless conveyor through a distance equal to the spacing between adjacent sheet holders on said conveyor and to transfer the sheets in said tray to one of said endless conveyor sheet holders, each of said operations occurring once in each revolution of said rollers by said power drive means.

7. A collating machine comprising a pair of rotatable rollers in tangential contact with one another, each of the rollers including gripping means, a paper sheet hopper, a paper sheet conveyor means for delivering paper sheets one-by-one to one of said rollers to be gripped by the gripping means thereof at an angular position thereon spaced from its point of engagement with the other of said rollers, paper sheet feeding means for feeding paper sheets one-by-one to said paper sheet conveyor means, means adjacent said one roller for applying a glue strip along an edge of a paper sheet held by said one roller, carbon feeding means for feeding a continuous carbon web to said other roller to be gripped by the gripping means thereof, carbon sheet forming means to sever said carbon web to form a carbon sheet when said carbon web is gripped by said other roller, means to press said carbon sheet held by said other roller against said glue strip on a paper sheet held by said one roller as said sheets pass between said rollers, and a tray disposed adjacent said pair of rollers to receive said sheets from said rollers after they pass therebetween, an endless conveyor having its upper flight disposed for travel adjacent said tray, a plurality of spaced apart sheet holders mounted on said endless conveyor, transfer means for transferring the sheets from said tray to one of said endless conveyor sheet holders, a power drive means; means transmitting the drive of said drive means to said pair of rollers to rotate said rollers simultaneously; and means simultaneously transmitting the drive of said drive means to operate said paper conveyor means, said paper sheet feeding means, said carbon feeding and forming means, said endless conveyor and said transfer means, to deliver one paper sheet from said paper sheet conveyor to said pair of rollers, to feed one paper sheet from said hopper to said paper sheet conveyor, to form and feed one carbon sheet to said pair of rollers, to move the upper flight of said endless conveyor through a distance equal to the spacing between said sheet holders thereon, and to transfer the sheets in said tray to one of said endless conveyor sheet holders, each of said operations occurring once in each revolution of said rollers by said power drive means.

8. A collating machine comprising a plurality of units; each unit comprising a pair of rotatable rollers in tangential contact with one another, each of the rollers including gripping means, a paper sheet feeding means for feeding paper sheets one-by-one to one of said rollers to be gripped by the gripping means thereof, carbon feeding means for feeding a continuous carbon web to said other roller to be gripped by the gripping means thereof, carbon sheet forming means to sever said carbon web to form a carbon sheet when said carbon web is gripped by said other roller, means to attach said carbon sheet and paper sheet together as said sheets pass between said rollers, and a tray disposed adjacent said pair of rollers to receive said sheets from said rollers after they pass therebetween; an endless conveyor having its upper flight disposed for travel adjacent the tray of each unit, a plurality of sheet holders mounted on said endless conveyor and spaced apart thereon in correspondence to the spacing between said trays, transfer means for simultaneously transferring the sheets from all of said trays to said endless conveyor sheet holders with the sheets from each tray being transferred to different sheet holders; ejecting means for removing said sheets from said endless conveyor after the upper flight of said endless conveyor has passed the last of said trays; a power drive means; means transmitting the drive of said drive means to said pair of rollers of each unit to rotate said rollers simultaneously; and means simultaneously transmitting the drive of said drive means to operate each of said paper sheet feeding means, each of said carbon feeding and forming means, said endless conveyor, each of said transfer means and said ejecting means, to feed one paper sheet to each of said pair of rollers, to form and feed one carbon sheet to each pair of rollers, to move the upper flight of said endless conveyor through a distance equal to the spacing between said trays, to transfer the sheets in all of said trays to said endless conveyor sheet holders and to remove the sheets from one of said sheet holders, each of said operations occurring once in each revolution of said rollers by said power drive means.

9. A collating machine comprising a plurality of units; each unit comprising a pair of rotatable rollers in tangential contact with one another, each of said rollers, including gripping means, a paper sheet feeding means for feeding paper sheets one-by-one to one of said rollers to be gripped by the gripping means thereof, carbon feeding means for feeding a continuous carbon web to said other roller to be gripped by the gripping means thereof, carbon sheet forming means to sever said carbon web to form a carbon sheet when said carbon web is gripped by said other roller, means to attach said carbon sheet and said paper sheet together as said sheets pass between said rollers, and a tray disposed adjacent said pair of rollers to receive said sheets from said rollers after they pass therebetween; and endless conveyor having its upper flight disposed for travel adjacent the tray of each unit, a plurality of sheet holders mounted on said endless conveyor and spaced apart thereon in correspondence to the spacing between said trays, transfer means for simultaneously transferring the sheets from all of said trays to said endless conveyor sheet holders with the sheets from each tray being transferred to different sheet holders, attachment means for attaching said sheets together after the upper flight of said conveyor has passed the last of said trays, ejecting means for removing said sheets from said endless conveyor after said sheets have been attached together; a power drive means; means transmitting the drive of said drive means to said pair of rollers of each unit to rotate said rollers simultaneously; and means simultaneously transmitting the drive of said drive means to operate each of said paper sheet feeding means, each of said carbon feeding and forming means, said endless conveyor, each of said transfer means, said attaching means and said ejecting means to deliver one paper sheet from each paper sheet conveyor to each pair of rollers, to feed one paper sheet to each of said pairs of rollers to form and feed one carbon sheet to each pair of rollers, to move the upper flight of said endless conveyor through a distance equal to the spacing between said trays, to transfer the sheets in all of said trays to said endless conveyor sheet holders, to attach the sheets together held by one sheet holder and to remove the attached together sheets from one of said sheet holders, each of said operations occurring once in each revolution of said rollers by said power drive means.

10. A collating machine comprising a plurality of units. each unit comprising a pair of rotatable rollers in tangential contact with one another, each of said rollers, including gripping means, a paper sheet hopper, a paper sheet conveyor means for delivering paper sheets one-by-one to one of said rollers to be gripped by the gripping means thereof at an angular position thereon spaced from its point of engagement with the other of said rollers, paper sheet feeding means for feeding paper sheets one-by-one to said paper sheet conveyor means, means adjacent said one roller for applying two spaced apart glue strips along an edge of a paper sheet held by said one roller, carbon feeding means for feeding a continuous carbon web to said other roller to be gripped by the gripping means thereof, carbon sheet forming means to sever said carbon web to form a carbon sheet when said carbon web is gripped by said other roller, means to press said carbon sheet by said other roller against one of said glue strips on a paper sheet held by said one roller as said sheets pass between said rollers, and a tray disposed adjacent said pair of rollers to receive said sheets from said rollers after they pass therebetween; an endless conveyor having its upper flight disposed for travel adjacent the tray of each unit, a plurality of sheet holders mounted on said endless conveyor and spaced apart thereon in correspondence to the spacing between said trays, transfer means for simultaneously transferring the sheets from all of said trays to said endless conveyor sheet holders with the sheets from each tray being transferred to different sheet holders; a power drive means; means transmitting the drive of said drive means to said pair of rollers of each unit to rotate said rollers simultaneously; and means simultaneously transmitting the drive of said drive means to operate each of said paper conveyor means, each of said paper sheet feeding means, each of said carbon feeding and forming means, said endless conveyor, and each of said transfer means, to deliver one paper sheet from each paper sheet conveyor to each pair of rollers, to feed one paper sheet from each hopper to each of said paper sheet conveyors, to form and feed one carbon sheet to each pair of rollers, to move the upper flight of said endless conveyor through a distance equal to the spacing between said trays, and to transfer the sheets in all of said trays to said endless conveyor sheet holders, each of said operations occurring once in each revolution of said rollers by said power drive means.

11. A collating machine comprising a plurality of units; each unit comprising a pair of rotatable rollers in tangential contact with one another, each of the rollers including gripping means, a paper sheet hopper, a paper sheet conveyor means for delivering paper sheets one-by-one to one of said rollers to be gripped by the gripping means thereof at an angular position thereon spaced from its point of engagement with the other of said rollers, paper sheet feeding means for feeding paper sheets one-by-one to said paper sheet conveyor means, means adjacent said one roller for applying two spaced apart glue strips along an edge of a paper sheet held by said one roller, carbon feeding means for feeding a continuous carbon web to said other roller to be gripped by the gripping means thereof, carbon sheet forming means to sever said carbon web to form a carbon sheet when said carbon web is gripped by said other roller, means to press said carbon sheet held by said other roller against one of said glue strips on a paper sheet held by said one roller as said sheets pass between said rollers, and a tray disposed adjacent said pair of rollers to receive said sheets from said rollers after they pass therebetween; an endless conveyor having its upper flight disposed for travel adjacent the tray of each unit, a plurality of sheet holders mounted on said endless conveyor and spaced apart thereon in correspondence to the spacing between said trays, transfer means for simultaneously transferring the sheets from all of said trays to said endless conveyor sheet holders with the sheets from each tray being transferred to different sheet holders, pressing means associated with said conveyor for pressing said sheets together along the other of said glue strips, ejecting means for removing said sheets from said endless conveyor after the upper flight of said endless conveyor has passed the last of said trays; a power drive means; means transmitting the drive of said drive means to said pair of rollers of each unit to rotate said rollers simultaneously; and means simultaneously transmitting the drive of said drive means to operate each of said paper conveyor means, each of said paper sheet feeding means, each of said carbon feeding and forming means, said endless conveyor, each of said transfer means, said pressing means and said ejecting means to deliver one paper sheet from each paper sheet conveyor to each pair of rollers, to feed one paper sheet from each hopper to each of said paper sheet conveyors, to form and feed one carbon sheet to each pair of rollers, to move the upper flight of said endless conveyor through a distance equal to the spacing between said trays, to transfer the sheets in all of said trays to said endless conveyor sheet holders, to press the sheets held by one sheet holder and to remove the sheets from one of said sheet holders, each of said operations occurring once in each revolution of said rollers by said power drive means.

12. Apparatus for forming and handling carbon sheets comprising means including a first roller for feeding a continuous carbon web therefrom at a constant speed, a second roller, gripping means on said second roller for gripping the leading edge of said carbon web, power drive means for rotating said first and second rollers with the peripheral speed of said second roller being greater than that of said first roller, means for forming a slack loop in said carbon web when said carbon web is initially gripped by said second roller, a first cutter member disposed across and on one side of said path between said first and second rollers, a second cutter member disposed on the other side of said path in opposition to said first cutter member, and means for bringing said cutter members together in timed synchronism with the rotation of said second roller to sever a carbon web therebetween when said carbon web is initially gripped by said second roller.

13. Apparatus for forming and handling carbon sheets comprising means including a first roller for feeding a continuous carbon web therefrom at a constant speed, a second roller, gripping means on said second roller for gripping the leading edge of said carbon web, guide means for guiding said carbon web along a predetermined path from said first roller to said second roller, power means for rotating said first and second rollers with the peripheral speed of said second roller being greater than that of said first roller, a pair of parallel and spaced apart guide members disposed across and on one side of said predetermined path, a slack member disposed across and on the other side of said predetermined path, said slack member being parallel to said guide members, cam operated means for moving said slack member to between said guide members to increase the length of said path and for removing said slack member from between said guide members to decrease the length of said path, means for operating said cam operated means in timed synchronism with the rotation of said second roller to decrease the length of said path when said carbon web is initially gripped by said second roller, and means for severing said carbon web between said first and second rollers after said carbon web is initially gripped by said second roller.

14. Apparatus for forming and handling carbon sheets comprising means including a first roller for feeding a continuous carbon web therefrom at a constant speed, a second roller, gripping means on said second roller for gripping the leading edge of said carbon web, guide means for guiding said carbon web along a predetermined path from said first roller to said second roller, power drive means for rotating said first and second rollers with the peripheral speed of said second roller being greater than that of said first roller, means operable in timed synchronism with the rotation of said second roller to decrease the length of said predetermined path when said carbon web is initially gripped by said second roller, a first cutter member disposed across and on one side of said path between said first and second rollers, a second cutter member disposed across and on the other side of said path in opposition to said first cutter member, and means for bringing said cutter members together in timed synchronism with the rotation of said second roller to sever a carbon web therebetween when said carbon web is initially gripped by said second roller.

15. Apparatus for forming and handling carbon sheets comprising means including a first roller for feeding a continuous carbon web therefrom at a constant speed, a second roller, gripping means on said second roller for gripping the leading edge of said carbon web, power drive means for rotating said first and second rollers with the peripheral speed of said second roller being greater than that of said first roller, means for forming a slack loop in said carbon web when said carbon web is initially gripped by said second roller, a rotatable knife member disposed transversely to and on one side of said path between said slack roller and said second roller, an anvil member disposed transversely to and on the other side of said path adjacent said knife member, means for bringing said knife and anvil members together in timed synchronism with the rotation of said second roller to sever a carbon web therebetween and form a carbon sheet when said carbon web is initially gripped by said second roller, and drive means for rotating said knife member at a peripheral speed equal to the peripheral speed of said second roller.

16. Apparatus for forming and handling carbon sheets comprising means including a first roller for feeding a continuous carbon web therefrom at a constant speed, a second roller, gripping means on said second roller for gripping the leading edge of said carbon web, guide means for guiding said carbon web along a predetermined path from said first roller to said second roller, power drive means for rotating said first and second rollers with the peripheral speed of said second roller being greater than that of said first roller, a pair of parallel and spaced apart guide rollers disposed transversely to and on one side of said predetermined path, a slack roller disposed transversely to and on the other side of said predetermined path, said slack roller being parallel to said guide rollers, cam operated means for moving said slack roller through said path to between said guide rollers and for removing said slack roller from between said guide rollers back to said other side of said path to form a slack loop in said carbon web, means for operating said cam operated means in timed synchronims with the rotation of said second roller to form said slack loop in said carbon web when said carbon web is initially gripped by said second roller, and means for severing said carbon web between said first and second rollers after said carbon web is gripped by said second roller and before said slack loop is taken up.

17. Apparatus for forming and handling carbon sheets comprising means including a first roller for feeding a continuous carbon web therefrom at a constant speed, a second roller, guide means for guiding said carbon web along a predetermined path from said first roller to said second roller, longitudinally disposed vacuum operated gripping means on the surface of said second roller for gripping the leading edge of said carbon web at a predetermined position on said second roller, power drive means for rotating said first and second rollers with the peripheral speed of said second roller being greater than that of said first roller, a pair of parallel and spaced apart guide rollers disposed transversely to and on one side of said predetermined path, a slack roller disposed transversely to and on the other side of said predetermined path, said slack roller being parallel to said guide rollers, cam operated means for moving said slack roller through said path to between said guide rollers and for removing said slack roller from between said guide rollers back to said other side of said path to form a slack loop in said carbon web, means for operating said cam operated means in timed synchronism with the rotation of said second roller to form said slack loop in said carbon web when said carbon web is initially gripped by said second roller, a first cutter member disposed across and on one side of said path between said first and said second rollers, a second cutter member disposed across and on the other side of said path in opposition to said first cutter member, and means for bringing said cutter members together in timed synchronism with the rotation of said second roller to sever a carbon web therebetween when said carbon web is initially gripped by said second roller.

18. Apparatus for forming and handling carbon sheets comprising means including a first roller for feeding a continuous carbon web therefrom at a constant speed, a second roller, guide means for guiding said carbon web along a predetermined path from said first roller to said second roller, longitudinally disposed vacuum operated gripping means on the surface of said second roller for gripping the leading edge of said carbon web at a predetermined position on said second roller, power drive means for rotating said first and second rollers with the peripheral speed of said second roller being greater than that of said first roller, a pair of parallel and spaced apart guide rollers disposed transversely to and on one side of said predetermined path, a slack roller disposed transversely to and on the other side of said predetermined path, said slack roller being parallel to said guide rollers, cam operated means for moving said slack roller slowly through said path to between said guide rollers and for removing said slack roller rapidly from between said guide rollers back to said other side of said path to form a slack loop in said carbon web, means for operating said cam operated means in timed synchronism with the rotation of said second roller to form said slack loop in said carbon web when said carbon web is initially gripped by said second roller, a rotatable knife member disposed transversely to and on one side of said path between said slack roller and said second roller, an anvil member disposed transversely to and on the other side of said path adjacent said knife member, means for bringing said knife and anvil members together in timed synchronism with the rotation of said second roller to sever a carbon web therebetween and form a carbon sheet when said carbon web is initially gripped by said second roller, and drive means for rotating said knife member at a peripheral speed equal to the peripheral speed of said second roller.

19. Apparatus for forming and handling carbon sheets comprising means including a first roller for feeding a continuous carbon web therefrom at a constant speed, a second roller, gripping means on said second roller for gripping the leading edge of said carbon web, power drive means for rotating said first and second rollers with the peripheral speed of said second roller being greater than that of said first roller, means for forming a slack loop in said carbon web when said carbon web is initially gripped by said second roller, a first cutter member disposed across and on one side of said path between said first and second rollers, a second cutter member disposed on the other side of said path in opposition to said first cutter member, means for bringing said cutter members together in timed synchronism with the rotation of said second roller to sever a carbon web therebetween when said carbon web is initially gripped by said second roller, a third roller mounted parallel to and in peripheral contact with said second roller, drive means for driving said third roller at the same peripheral speed as said second roller, gripping means on said third roller for gripping a paper sheet, means for feeding a paper sheet to said third roller in timed synchronism to the rotation of said third roller to be gripped by the gripping means thereof, and means for attaching said carbon sheet to said paper sheet as said sheets pass between said second and third rollers.

20. Apparatus for forming and handling carbon sheets comprising means including a first roller for feeding a continuous carbon web therefrom at a constant speed, a second roller, gripping means on said second roller for gripping the leading edge of said carbon web, guide means for guiding said carbon web along a predetermined path from said first roller to said second roller, power drive means for rotating said first and second rollers with the peripheral speed of said second roller being greater than that of said first roller, means operable in timed synchronism with the rotation of said second roller to decrease the length of said predetermined path when said carbon web is initially gripped by said second roller, a first cutter member disposed across and on one side of said path between said first and second rollers, a second cutter member disposed across and on the other side of said path in opposition to said first cutter member, means for bringing said cutter members together in timed synchronism with the rotation of said second roller to sever a carbon web therebetween when said carbon web is initially gripped by said second roller, a third roller mounted parallel to and in peripheral contact with said second roller, drive means for driving said third roller at the same peripheral speed as said second roller, gripping means on said third roller for gripping a paper sheet, means for feeding a paper sheet to said third roller in timed synchronism to the rotation of said third roller to be gripped by the gripping means thereof, means adjacent said third roller between said paper sheet feeding means and said second roller for applying a strip of glue adjacent one edge of a paper sheet held on said third roller by said gripping means, and means for pressing said carbon sheet against said glue strip on said paper sheet as said sheets pass between said second and third rollers.

21. In an apparatus as set forth in claim 20 further including a perforating wheel mounted in tangential engagement with said third roller between said paper sheet feeding means and said second roller for perforating a paper sheet adjacent said glue strip thereon when said paper sheet is held on said third roller by said gripping means thereon.

22. Apparatus for forming and handling carbon sheets comprising means including a first roller for feeding a continuous carbon web therefrom at a constant speed, a second roller, gripping means on said second roller for gripping the leading edge of said carbon web, guide means for guiding said carbon web along a predetermined path from said first roller to said second roller, power drive means for rotating said first and second rollers with the peripheral speed of said second roller being greater than that of said first roller, a pair of parallel and spaced apart guide rollers disposed transversely to and on one side of said predetermined path, a slack roller disposed transversely to and on the other side of said predetermined path, said slack roller being parallel to said guide rollers, cam operated means for moving said slack roller through said path to between said guide roller and for removing said slack roller from between said guide rollers back to said other side of said path to form a slack loop in said carbon web, means for operating said cam operated means in timed synchronism with the rotation of said second roller to form said slack loop in said carbon web when said carbon web is initially gripped by said second roller, means for severing said carbon web between said first and second rollers after said carbon web is gripped by said second roller and before said slack loop is taken up, a third roller mounted parallel to and in peripheral contact with said second roller, drive means for driving said third roller at the same peripheral speed as said second roller, gripping means on said third roller for gripping a paper sheet at a predetermined position on said third roller, means for feeding a paper sheet to said third roller in timed synchronism to the rotation of said third roller to be gripped by the gripping means thereof, means adjacent said third roller between said paper sheet feeding means and said second roller for applying a strip of glue adjacent one edge of a paper sheet held on said third roller by said gripping means thereon, and means for pressing said carbon sheet against said glue strip on said paper sheet as said sheets pass between said second and third rollers.

23. In an apparatus as set forth in claim 22 further including a perforating wheel mounted in tangential engagement with said third roller between said paper sheet feeding means and said second roller for perforating a paper sheet adjacent said glue strip thereon when said paper sheet is held on said third roller by said gripping means thereon, and a printing roll mounted in tangential engagement with said third roller between said paper sheet feeding means for printing indicia on a paper sheet held on said third roller by said gripping means thereon.

24. Apparatus for forming and handling carbon sheets comprising means including a first roller for feeding a continuous carbon web therefrom at a constant speed, a second roller, gripping means on said second roller for gripping the leading edge of the said carbon web, guide means for guiding said carbon web along a predetermined path from said first roller to said second roller, power drive means for rotating said first and second rollers with the peripheral speed of said second roller being greater than that of said first roller, a pair of parallel and spaced apart guide members disposed across and on one side of said predetermined path, a slack member disposed across and on the other side of said predetermined path, said slack member being parallel to said guide members, cam operated means for moving said slack member to between said guide members to increase the length of said path and for removing said slack member from between said guide members to decrease the length of said path, means for operating said cam operated means in timed synchronism with the rotation of said second roller to decrease the length of said path when said carbon web is initially gripped by said second roller, means for severing said carbon web between said first and second rollers after said carbon web is initially gripped by said second roller, a third roller mounted parallel to and in peripheral contact with said second roller, power drive means for driving said third roller at the same peripheral speed as said second roller, gripping means on said third roller for gripping a paper sheet at a predetermined position on said third roller, means for feeding a paper sheet to said third roller in timed synchronism to the rotation of said third roller to be gripped by the gripping means thereof, means adjacent said third roller between said paper sheet feeding means and said second roller for applying parallel strips of glue adjacent one edge of a paper sheet held on said third roller by said gripping means thereon, means for pressing said carbon sheet against one of said glue strips on said paper sheet as said sheets pass between said second and third rollers, and means for stripping said sheets from said second and third rollers after they pass therebetween.

25. In an apparatus as set forth in claim 24 further including a perforating wheel mounted in tangential engagement with said third roller between said paper sheet feeding means and said second roller for perforating a paper sheet adjacent said glue strips thereon when said paper sheet is held on said third roller by said gripping means thereon.

26. In an apparatus as set forth in claim 24 further including a printing roll mounted in tangential engagement with said third roller between said paper sheet feeding means and said second roller for printing indicia on a paper sheet held on said third roller by said gripping means thereon.

27. In an apparatus as set forth in claim 24 further including a perforating wheel mounted in tangential engagement with said third roller between said paper sheet feeding means and said second roller for perforating a paper sheet adjacent said glue strips thereon when said paper sheet is held on said third roller by said gripping means thereon, and a printing roll mounted in tangential engagement with said third roller between said paper sheet feeding means and said second roller for printing indicia on a paper sheet held on said third roller by said gripping means thereon.

28. Apparatus for forming and handling carbon sheets comprising means including a first roller for feeding a continuous carbon web therefrom at a constant speed, a second roller, guide means for guiding said carbon web along a predetermined path from said first roller to said second roller, longitudinally disposed vacuum operated gripping means on the surface of said second roller for gripping the leading edge of said carbon web at a predetermined position on said second roller, power drive means for rotating said first and second rollers with the peripheral speed of said second roller being greater than that of said first roller, a pair of parallel and spaced apart guide rollers disposed transversely to and on one side of said predetermined path, a slack roller disposed transversely to and on the other side of said predetermined path, said slack roller being parallel to said guide rollers, cam operated means for moving said slack roller slowly through said path to between said guide rollers and for removing said slack roller rapidly from between said guide rollers back to said other side of said path to form a slack loop in said carbon web, means for operating said cam operated means in timed synchronization with the rotation of said second roller to form said slack loop in said carbon web when said carbon web is initially gripped by said second roller, a rotatable knife member disposed transversely to and on one side of said path between said slack roller and said second roller, an anvil member disposed transversely to and on the other side of said path adjacent said knife member, means for bringing said knife and anvil members together in timed synchronism with the rotation of said second roller to sever a carbon web therebetween and form a carbon sheet when said carbon web is initially gripped by said second roller, drive means for rotating said knife member at a peripheral speed equal to the peripheral speed of said second roller, a third roller mounted parallel to and in peripheral contact with said second roller, power drive means for driving said third roller at the same peripheral speed as said second roller, longitudinally disposed vacuum-operated gripping means on the surface of said third roller for gripping a paper sheet at a predetermined position on said third roller, means for feeding a paper sheet to said third roller in timed synchronism to the rotation of said third roller to be gripped by the gripping means thereof, means adjacent said third roller between said paper sheet feeding means and said second roller for applying parallel strips of glue adjacent one edge of a paper sheet held on said third roller by said gripping means thereon, means for pressing said carbon sheet against one of said glue strips on said paper sheet as said sheets pass between said second and third rollers, and means for stripping said sheets from said second and third rollers after they pass therebetween.

29. The method of forming and handling carbon sheets comprising the steps of feeding a continuous carbon web at a certain speed from a first position towards a second position spaced therefrom, gripping the leading edge of carbon web at said second position, feeding said continuous web from said second position at a speed greater than said certain speed, forming a slack loop in said carbon web between said positions as said carbon web is gripped at said second position and severing said carbon web between said positions as said carbon web is gripped at said second position and before said slack loop is taken up.

30. The method of forming and handling carbon sheets comprising the steps of feeding, at a certain speed, a continuous carbon web from a first position toward a second position spaced therefrom, gripping the leading edge of said carbon web at said second position, feeding said continuous web from said second position at a speed greater than said certain speed, forming a slack loop in said carbon web between said two positions as said carbon web is gripped at said second position, severing said carbon web transverse to its length between said second position and said slack loop and at a predetermined distance from said second position after said carbon web is gripped at said second position and taking up said slack loop after said web has been severed.

31. The method of forming and handling carbon sheets comprising the steps of feeding a continuous carbon web at a certain speed from a first position towards a second position spaced therefrom, gripping the leading edge of said carbon web at said second position, feeding said continuous web from said second position at a speed greater than said certain speed, forming a slack loop in said carbon web between said positions as said carbon web is gripped at said second position, severing said carbon web between said second position and said slack loop at a predetermined distance from said second position after said carbon web is gripped at said second position and before said slack loop is taken up; varying said predetermined distance between said second position to the point of severing and varying the ratio of the speeds of said web from said first and second positions in direct proportion to the varying of said predetermined distance.

32. The method of collating carbon and paper sheets comprising the steps of feeding a continuous carbon web at a certain speed from a first position to a second position, gripping the leading edge of said carbon web at said second position, moving the leading edge of said carbon web away from said second position at a linear speed greater than said certain speed, forming a slack loop in said carbon web between said positions as said carbon web is gripped at said second position, severing said carbon web between said first and second positions as said carbon web is gripped at said second position and before said slack loop is taken up to form a carbon sheet gripped at said second position and attaching a sheet of paper to said carbon sheet before said carbon sheet is released from said second position.

References Cited in the file of this patent

UNITED STATES PATENTS

| | | |
|---|---|---|
| 1,028,913 | Sheldon | June 11, 1912 |
| 1,453,636 | Pachter | May 1, 1923 |
| 1,486,306 | Schultz | Mar. 11, 1924 |
| 2,226,397 | West et al. | Dec. 24, 1940 |
| 2,233,922 | Kaddeland | Mar. 4, 1941 |
| 2,479,060 | Davidson | Aug. 16, 1949 |
| 2,538,425 | Nolan | Jan. 16, 1951 |
| 2,972,477 | Austin | Feb. 21, 1961 |